US012578751B2

(12) United States Patent
Gu

(10) Patent No.: US 12,578,751 B2
(45) Date of Patent: Mar. 17, 2026

(54) DATA PROCESSING CIRCUITRY AND METHOD, AND SEMICONDUCTOR MEMORY

(71) Applicant: CHANGXIN MEMORY TECHNOLOGIES, INC., Hefei City (CN)

(72) Inventor: Yinchuan Gu, Hefei (CN)

(73) Assignee: CHANGXIN MEMORY TECHNOLOGIES, INC., Hefei City (CN)

(*) Notice: Subject to any disclaimer, the term of this patent is extended or adjusted under 35 U.S.C. 154(b) by 210 days.

(21) Appl. No.: 18/448,891

(22) Filed: Aug. 11, 2023

(65) Prior Publication Data

US 2023/0384818 A1 Nov. 30, 2023

Related U.S. Application Data

(63) Continuation of application No. PCT/CN2022/097543, filed on Jun. 8, 2022.

(30) Foreign Application Priority Data

May 25, 2022 (CN) .......................... 202210581025.X

(51) Int. Cl.
*G06F 1/06* (2006.01)
(52) U.S. Cl.
CPC ...................................... *G06F 1/06* (2013.01)
(58) Field of Classification Search
CPC ...................................................... G06F 1/06
See application file for complete search history.

(56) References Cited

U.S. PATENT DOCUMENTS

| | | | | |
|---|---|---|---|---|
| 11,031,054 B1* | 6/2021 | Arai | ...................... | G11C 29/022 |
| 2005/0238129 A1* | 10/2005 | Ishida | ...................... | H04L 7/044 |
| 2007/0153591 A1 | 7/2007 | Choi | | |
| 2011/0007591 A1 | 1/2011 | Lee | | |
| 2012/0243361 A1 | 9/2012 | Lee | | |
| 2018/0123593 A1* | 5/2018 | Choi | .............. | H03K 19/018571 |

(Continued)

FOREIGN PATENT DOCUMENTS

| | | |
|---|---|---|
| CN | 103684698 A | 3/2014 |
| CN | 111030703 A | 4/2020 |

(Continued)

OTHER PUBLICATIONS

International Search Report in the international application No. PCT/CN2022/097543, mailed on Nov. 25, 2022. 7 Pages with English translation.

*Primary Examiner* — Thomas C Lee

(74) *Attorney, Agent, or Firm* — Syncoda LLC; Feng Ma

(57) ABSTRACT

A data processing circuitry includes: a preprocessing circuit, configured to receive an initial data signal and generate a data signal to be processed and an auxiliary data signal according to the initial data signal; and a drive circuit, connected with the preprocessing circuit and configured to: adjust an initial calibration code according to a preset scenario, to obtain a target calibration code; adjust a value of a drive resistance of the drive circuit according to the target calibration code; and adjust a drive capability of the data signal to be processed according to the auxiliary data signal and the adjusted drive resistance, to generate a target data signal.

18 Claims, 12 Drawing Sheets

(56)                References Cited

U.S. PATENT DOCUMENTS

| | | | |
|---|---|---|---|
| 2019/0044766 A1* | 2/2019 | Lin | ...................... G11C 7/1096 |
| 2019/0349226 A1 | 11/2019 | Chong | |
| 2020/0293080 A1 | 9/2020 | Poon | |
| 2020/0295742 A1* | 9/2020 | Hagiwara | ............. G06F 3/0679 |
| 2024/0321331 A1* | 9/2024 | Kim | ...................... G11C 7/109 |

FOREIGN PATENT DOCUMENTS

| | | | |
|---|---|---|---|
| CN | 114024544 A | 2/2022 | |
| CN | 114128146 A | 3/2022 | |
| JP | 2006060690 A | 3/2006 | |

* cited by examiner

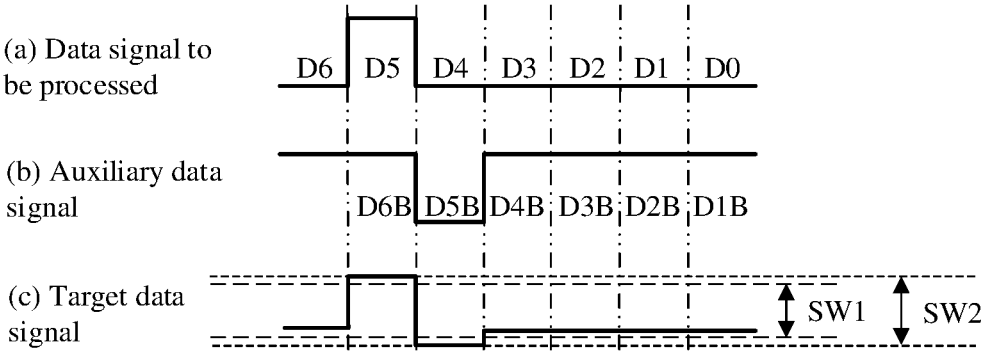

(a) Data signal to be processed (b) Auxiliary data signal (c) Target data signal

FIG. 15

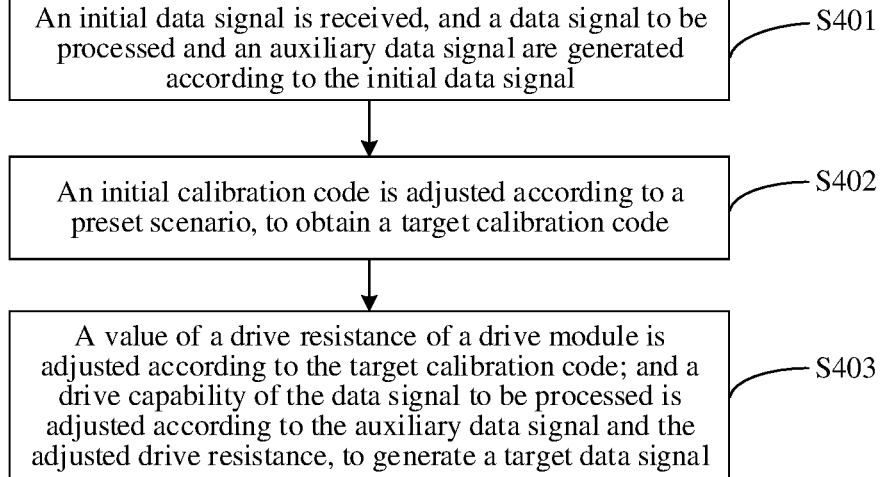

An initial data signal is received, and a data signal to be processed and an auxiliary data signal are generated according to the initial data signal — S401

An initial calibration code is adjusted according to a preset scenario, to obtain a target calibration code — S402

A value of a drive resistance of a drive module is adjusted according to the target calibration code; and a drive capability of the data signal to be processed is adjusted according to the auxiliary data signal and the adjusted drive resistance, to generate a target data signal — S403

FIG. 16

DATA PROCESSING CIRCUITRY AND METHOD, AND SEMICONDUCTOR MEMORY

CROSS-REFERENCE TO RELATED APPLICATIONS

This is a continuation of International Patent Application No. PCT/CN2022/097543 filed on Jun. 8, 2022, which claims priority to Chinese patent application No. 202210581025.X filed on May 25, 2022. The disclosures of the above-referenced applications are hereby incorporated by reference in their entirety.

BACKGROUND

With the continuous development of a semiconductor technology, people have an increasingly requirement for data transmission speed when manufacturing and using computers and other devices. In order to obtain faster data transmission speed, a series of memory devices such as fourth-generation Double Data Rate (DDR4) chip and fifth-generation DDR (DDR5) chip have emerged, which can transmit data at a double data rate.

In the related art, compared with the DDR4 chip, the maximum data transmission speed of the DDR5 chip has been increased from 3200 Mbps to 6400 Mbps.

SUMMARY

The disclosure relates to the technical field of semiconductors, and aims to provide a data processing circuitry, a data processing method, and a semiconductor memory.

In a first aspect, an embodiment of the disclosure provides a data processing circuitry, which includes a preprocessing module and a drive module.

The preprocessing module is configured to: receive an initial data signal, and generate a data signal to be processed and an auxiliary data signal according to the initial data signal. The initial data signal is a parallel data signal, the data signal to be processed and the auxiliary data signal are both serial data signals, a phase of the auxiliary data signal is opposite to a phase of the data signal to be processed and the auxiliary data signal is delayed from the data signal to be processed by a preset clock period.

The drive module is connected with the preprocessing module and configured to: adjust an initial calibration code according to a preset scenario, to obtain a target calibration code; adjust a value of a drive resistance of the drive module according to the target calibration code; and adjust a drive capability of the data signal to be processed according to the auxiliary data signal and the adjusted drive resistance, to generate a target data signal.

In a second aspect, an embodiment of the disclosure provides a data processing method, which includes the following operations.

An initial data signal is received, and a data signal to be processed and an auxiliary data signal are generated according to the initial data signal. The initial data signal is a parallel data signal, the data signal to be processed and the auxiliary data signal are both serial data signals, a phase of the auxiliary data signal is opposite to a phase of the data signal to be processed and the auxiliary data signal is delayed from the data signal to be processed by a preset clock period.

An initial calibration code is adjusted according to a preset scenario, to obtain a target calibration code.

A value of a drive resistance of a drive module is adjusted according to the target calibration code.

A drive capability of the data signal to be processed is adjusted according to the auxiliary data signal and the adjusted drive resistance, to generate a target data signal.

In a third aspect, an embodiment of the disclosure provides a semiconductor memory, which includes at least the data processing circuit in the first aspect.

BRIEF DESCRIPTION OF THE DRAWINGS

FIG. 15 is a schematic diagram illustrating signal timing according to yet another embodiment of the disclosure.

FIG. 16 is a schematic flowchart illustrating a data transmission method according to an embodiment of the disclosure.

DETAILED DESCRIPTION

Figure 1:
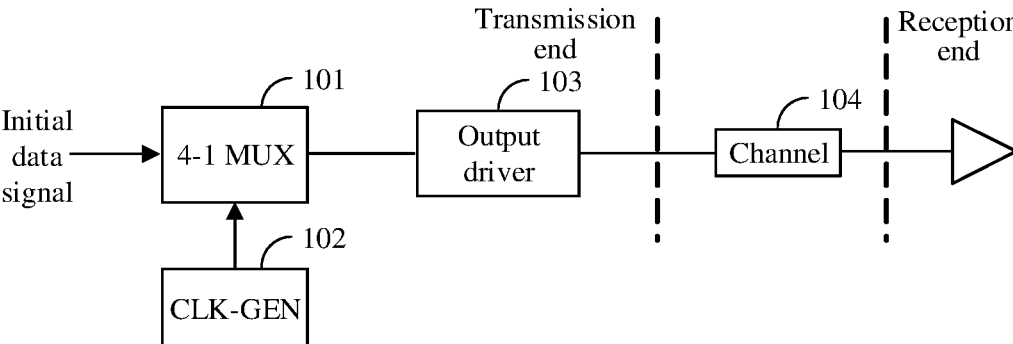
FIG. 1 is a schematic diagram illustrating a composition structure of a data transmission system.

The technical solutions in the embodiments of the disclosure will be clearly and completely described below with reference to the drawings in the embodiment of the disclosure. It is to be understood that the specific embodiments described herein are intended only to explain the relevant disclosure and not to limit the disclosure. In addition, it should be noted that portions related to the relevant disclosure are illustrated in the drawings for convenience of description.

All technical and scientific terms used herein have the same meanings as that commonly understood by those skilled in the art of the disclosure unless otherwise defined. The terms used herein are intended only to describe the embodiments of the disclosure and are not intended to limit the disclosure.

In the following description, the expression "some embodiments" is involved to describe a subset of all possible embodiments. However, it is understood that "some embodiments" may be a same subset or different subsets of all possible embodiments and may be combined with each other without conflict.

It should be noted that the term "first/second/third" referred to in the embodiments of the disclosure is merely used to distinguish similar objects and does not represent a particular ordering of objects. It is understood that "first/second/third" may be interchanged in a particular order or sequence where permissible to enable the embodiments of the disclosure described herein to be implemented in an order other than that illustrated or described herein.

FIG. 1 is a schematic diagram illustrating a composition structure of a data transmission system. As illustrated in FIG. 1, at a transmission end, a one-out-of-four data selector (4-1 MUX) 101 receives an initial data signal and a clock signal generated by a clock signal generator (CLK-GEN) 102, convert the initial data signal from a parallel data signal to a serial data signal based on the clock signal, and then transmits the processed data signal to an output driver 103. The processed data signal is driven by the output driver 103 and then transmitted to a reception end through a channel 104.

However, with the rapid development of semiconductor memory technology, the data transmission speed of the memory is also accelerated. For example, compared with the DDR4 chip, the maximum data transmission speed of the DDR5 chip is increased from 3200 Mbps to 6400 Mbps. However, in the process of data signal transmission, the existence of the channel loss will not only affect the signal quality, but also limit the data transmission speed.

Based on this, an embodiment of the disclosure provides a data processing circuitry, which includes a preprocessing module and a drive module. The preprocessing module is configured to receive an initial data signal and generate a data signal to be processed and an auxiliary data signal according to the initial data signal. The initial data signal is a parallel data signal, the data signal to be processed and the auxiliary data signal are both serial data signals, a phase of the auxiliary data signal is opposite to a phase of the data signal to be processed and the auxiliary data signal is delayed from the data signal to be processed by a preset clock period. The drive module is connected with the preprocessing module and configured to: adjust an initial calibration code according to a preset scenario, to obtain a target calibration code; adjust a value of a drive resistance of the drive module according to the target calibration code; and adjust a drive capability of the data signal to be processed according to the auxiliary data signal and the adjusted drive resistance, to generate a target data signal. In this way, the initial data signal is processed into the data signal to be processed and the auxiliary data signal. The target calibration code is determined based on the preset scenario. Then, the value of the drive resistance of the drive module is adjusted according to the target calibration code, and the driving ability of the data signal to be processed is adjusted according to the auxiliary data signal and the adjusted drive resistance, so that the resulting target data signal is adaptive to the preset scenario. Due to the adjustment of the driving capability of the data signal, the impact of the channel loss on the signal quality can be reduced, and the data transmission speed can be ensured effectively. Moreover, the driving resistance can be adjusted adaptively according to different preset scenarios, which enables the data processing circuitry to adapt to different channel scenarios, thereby improving the channel performance.

Embodiments of the disclosure will be described in detail below with reference to the drawings.

Figure 2:
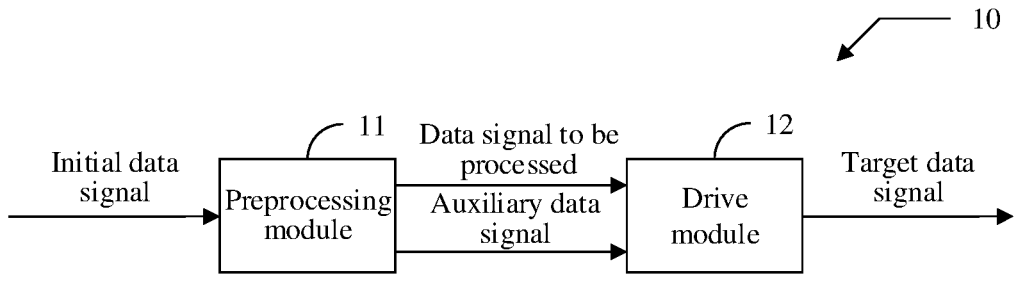
FIG. 2 is a schematic diagram illustrating a composition structure of a data processing circuitry according to an embodiment of the disclosure.

FIG. 2 is a schematic diagram illustrating a composition structure of a data processing circuitry according to an embodiment of the disclosure. As illustrated in FIG. 2, the data processing circuitry 10 includes a preprocessing module 11 and a drive module 12.

The preprocessing module 11 is configured to receive an initial data signal and generate a data signal to be processed and an auxiliary data signal according to the initial data signal. The initial data signal is a parallel data signal, the data signal to be processed and the auxiliary data signal are both serial data signals, a phase of the auxiliary data signal is opposite to a phase of the data signal to be processed and the auxiliary data signal is delayed from the data signal to be processed by a preset clock period.

The drive module 12 is configured to: adjust an initial calibration code according to a preset scenario, to obtain a target calibration code; adjust a value of a drive resistance of the drive module according to the target calibration code; and adjust a drive capability of the data signal to be processed according to the auxiliary data signal and the adjusted drive resistance, to generate a target data signal.

It should be noted that the data processing circuitry 10 provided by the embodiment of the disclosure may receive the initial data signal and process the initial data signal to generate and output a target data signal. The data processing circuitry 10 may be applied to a data transmission system and the target data signal is transmitted to a memory, a controller and the like at a reception end through a channel. In addition, the data processing circuitry 10 is mainly applied to the transmission end and is designed to improve a performance of a transmission channel.

It should also be noted that the preprocessing module 11 is connected with the drive module 12 in the embodiment of the disclosure. The preprocessing module 11 is configured to receive a parallel initial data signal, and perform parallel-to-serial processing on the initial data signal, to generate a serial data signal to be processed and a serial auxiliary data signal. Herein, the phase of the auxiliary data signal is opposite to the phase of the data signal to be processed and the auxiliary data signal is delayed from the data signal to be processed by a preset clock period.

In addition, the initial calibration code may be a ZQ calibration code, which is used to control the drive resistance of the drive module 12 to be a preset value. In the embodiment of the disclosure, in order to reduce the adverse impact of the channel loss on the signal quality during the transmission process of the target data signal, the initial calibration code may be adjusted according to the preset scenario to obtain the target calibration code conforming to the preset scenario. The preset scenario may represent a specific channel scenario for transmitting the target data signal. Since levels of signal loss in different channels may be different, it is necessary to determine the target calibration code based on the actual channel scenario. That is, the drive capability of the drive module 12 may be adjusted by the target calibration code, and the target calibration code is obtained by adjusting the initial calibration code according to the preset scenario. In short, different preset scenarios may correspond to different target calibration codes, and may correspond to different values of the drive resistance, thus realizing different drive capabilities of the drive module 12 and achieving the purpose of improving the channel performance according to different channel scenarios.

In such way, in the data processing circuitry 10, the drive capability of the data signal to be processed is adjusted according to the auxiliary data signal and the adjusted drive resistance, and a final target data signal may be generated. When the target data signal is transmitted in a channel under a preset scenario, the performance of the transmission channel can be improved, and the impact of channel loss on the signal quality can be reduced effectively.

Figure 3:
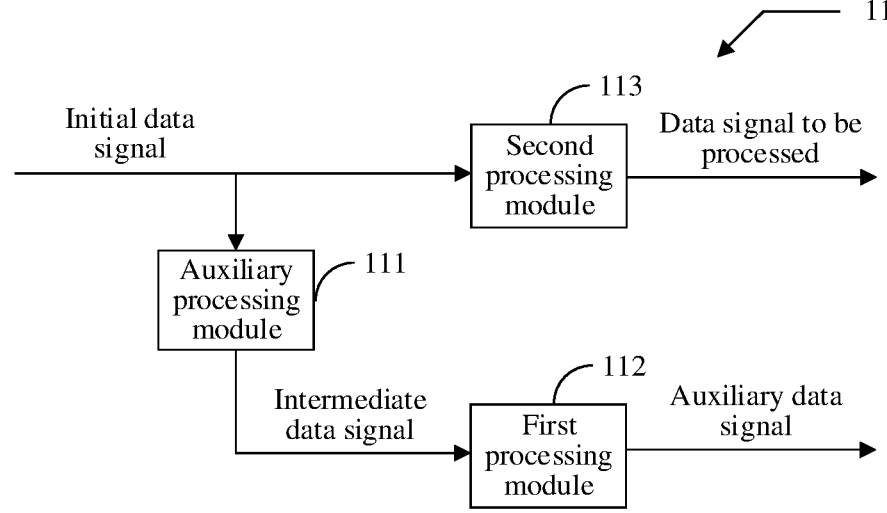
FIG. 3 is a schematic diagram illustrating a composition structure of a preprocessing module according to an embodiment of the disclosure.

In some embodiments, as illustrated in FIG. 3, the preprocessing module 11 may include an auxiliary processing module 111, a first processing module 112 and a second processing module 113.

The auxiliary processing module 111 is configured to receive the initial data signal, and shift and invert the initial data signal, to obtain an intermediate data signal.

The first processing module 112 is connected with the auxiliary processing module 111 and configured to: receive the intermediate data signal, and convert the intermediate data signal from a parallel data signal to a serial data signal, to output the auxiliary data signal.

The second processing module 113 is configured to receive the initial data signal, and convert the initial data signal from the parallel data signal to a serial data signal, to output the data signal to be processed.

It should be noted that in the preprocessing module 11, the auxiliary processing module 111 converts the initial data signal into the intermediate data signal, and the first processing module 112 and the second processing module 113 both perform the parallel-to-serial processing. In addition, the first processing module 112 and the second processing module 113 may be data selectors, for example 4-1 MUX, but may not be specifically limited.

It should also be noted that the first processing module 112 performs the parallel-to-serial processing on the intermediate data signal after receiving the intermediate data signal in the embodiment of the disclosure, thereby outputting a serial auxiliary data signal. The second processing module 113 performs the parallel-to-serial processing on the initial data signal after receiving the initial data signal, thereby outputting a serial data signal to be processed.

Figure 4:
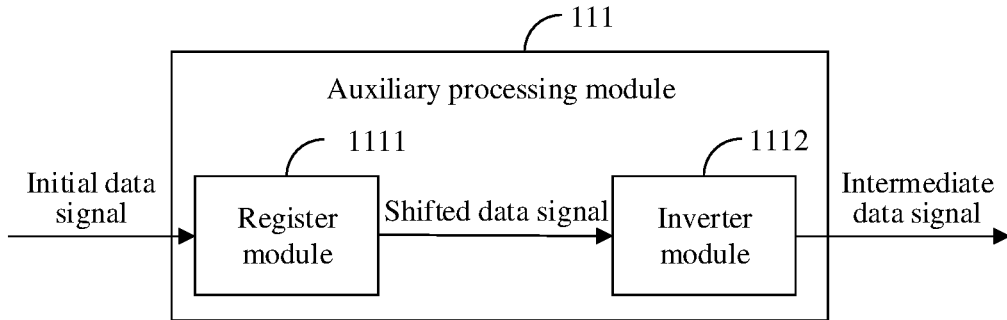
FIG. 4 is a schematic diagram illustrating a composition structure of an auxiliary processing module according to an embodiment of the disclosure.

Further, in some embodiments, as illustrated in FIG. 4, the auxiliary processing module 111 may include a register module 1111 and an inverter module 1112. An output end of the register module 1111 is connected to an input end of the inverter module 1112, and an output end of the inverter module 1112 is connected to the first processing module 112.

The register module 1111 is configured to shift the initial data signal to obtain a shifted data signal.

The inverter module 1112 is configured to invert the shifted data signal to obtain the intermediate data signal.

It should be noted that the auxiliary processing module 111 may include the register module 1111 capable of implementing a shift function and the inverter module 1112 capable of implementing an inverting function in the embodiment of the disclosure. The register module 1111 shifts the initial data signal after receiving the initial data signal, the initial data signal may be delayed by a preset clock period (or other duration according to actual requirements) and the obtained signal is recorded as the shifted data signal. The shifted data signal is transmitted to the inverter module 1112 for inverting processing, to obtain the intermediate data signal.

Figure 5:
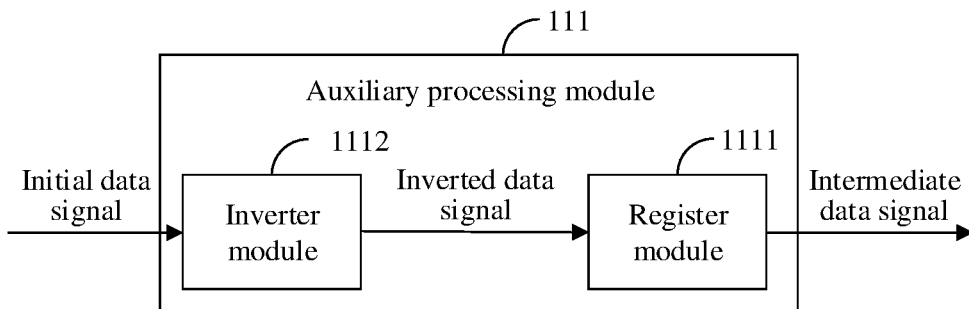
FIG. 5 is a schematic diagram illustrating a composition structure of an auxiliary processing module according to another embodiment of the disclosure.

It should also be noted that in an embodiment of the disclosure, the initial data signal may be inverted first, and then is shifted, to obtain the intermediate data signal. Specifically, as illustrated in FIG. 5, the initial data signal is received and inverted by the inverter module 1112, and the resulting signal is recorded as an inverted data signal. The inverted data signal is then transmitted to the register module 1111, which shifts the inverted data signal to obtain the intermediate data signal.

In an embodiment of the disclosure, the register module 1111 may be implemented by a shift register, and the inverter module 1112 may be implemented by an inverter. The shifted data signal may be delayed from the initial data signal by a preset clock period. In addition, the initial data signal, the shifted data signal and the intermediate data signal are all parallel data signals.

Figure 6:
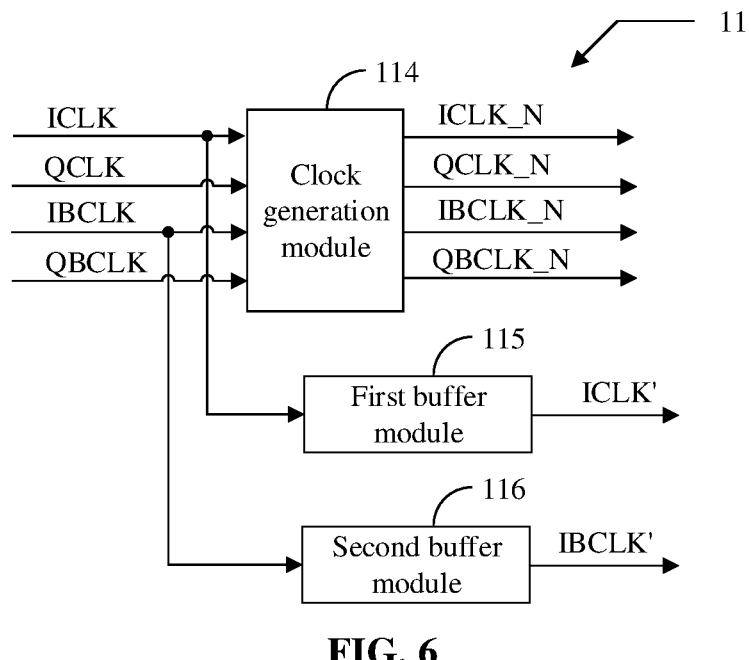
FIG. 6 is a schematic diagram illustrating a partial structure of a preprocessing module according to an embodiment of the disclosure.

Further, in some embodiments, as illustrated in FIG. 6, the preprocessing module 11 may further include a clock generation module 114, a first buffer module 115 and a second buffer module 116.

The clock generation module 114 is configured to: receive a first initial clock signal ICLK, a second initial clock signal QCLK, a third initial clock signal IBCLK, and a fourth initial clock signal QBCLK, and generate a first target clock signal ICLK_N, a second target clock signal QCLK_N, a third target clock signal IBCLK_N, and a fourth target clock signal QBCLK_N.

The first buffer module 115 is configured to delay the first initial clock signal ICLK and enhance a drive capability of the first initial clock signal, to obtain a first delay clock signal ICLK'.

The second buffer module 116 is configured to delay the third initial clock signal IBCLK and enhance a drive capability of the third initial clock signal, to obtain a second delay clock signal IBCLK'.

In the embodiment of the disclosure, phases of the first initial clock signal ICLK, the second initial clock signal QCLK, the third initial clock signal IBCLK and the fourth initial clock signal QBCLK are 0 degree, 90 degree, 180 degree and 270 degrees respectively. The first target clock signal ICLK_N is generated from a rising edge of the first initial clock signal ICLK, and a pulse width of the first target clock signal ICLK_N is smaller than a pulse width of the first initial clock signal ICLK. The second target clock signal QCLK_N is generated from a rising edge of the second initial clock signal QCLK, and a pulse width of the second target clock signal QCLK_N is smaller than a pulse width of the second initial clock signal QCLK. The third target clock signal IBCLK_N is generated from a rising edge of the third initial clock signal IBCLK, and a pulse width of the third target clock signal IBCLK_N is smaller than a pulse width of the third initial clock signal IBCLK. The fourth target clock signal QBCLK_N is generated from a rising edge of the fourth initial clock signal QBCLK, and a pulse width of the fourth target clock signal QBCLK_N is smaller than a pulse width of the fourth initial clock signal QBCLK.

In an embodiment of the disclosure, the clock generation module 114 may be implemented by a clock signal generator.

Figure 7:
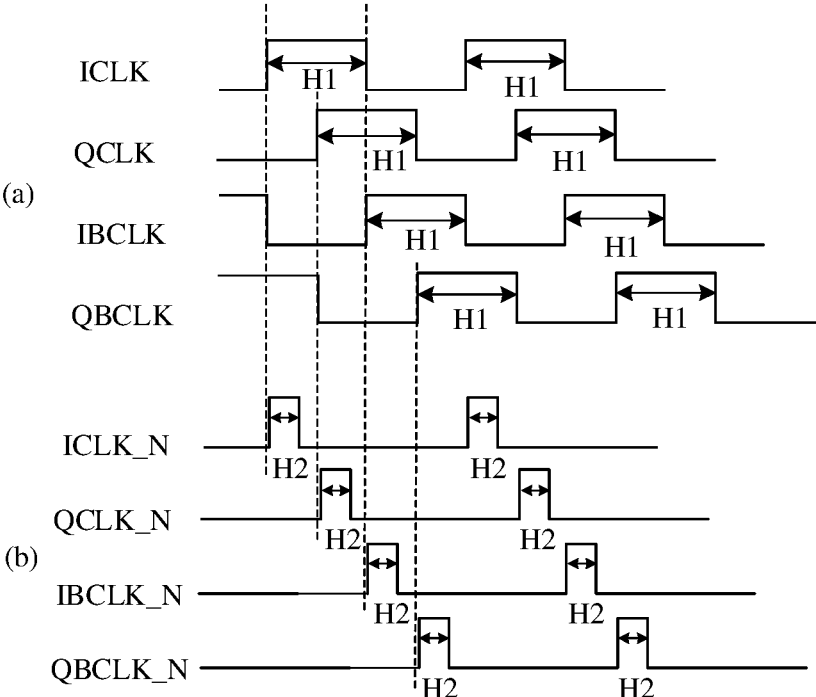
FIG. 7 is a schematic diagram illustrating signal timing according to an embodiment of the disclosure.

As an example, FIG. 7 is schematic diagram illustrating signal timing according to an embodiment of the disclosure, in which (a) is schematic diagram illustrating signal timings of initial clock signals, and (b) is schematic diagram illustrating signal timings of target clock signals. As illustrated in (a) of FIG. 7, the four initial clock signals may include the first initial clock signal ICLK, the second initial clock signal QCLK, the third initial clock signal IBCLK, and the fourth initial clock signal QBCLK. The phases of the four initial clock signals are 0 degree, 90 degree, 180 degree and 270 degree respectively, that is, the four clock signals are 90 degrees out of phase in turn.

As illustrated in (b) of FIG. 7, the four target clock signals may include the first target clock signal ICLK_N, the second target clock signal QCLK_N, the third target clock signal IBCLK_N, and the fourth target clock signal QBCLK_N.

As illustrated in FIG. 7, each dotted line corresponds to a rising edge of a respective initial clock signal. The first target clock signal ICLK_N is generated from the rising edge of the first initial clock signal ICLK, the second target clock signal QCLK_N is generated from the rising edge of the second initial clock signal QCLK, and the third target clock signal IBCLK_N is generated from the rising edge of the third initial clock signal IBCLK. The first target clock signal ICLK_N, the second target clock signal QCLK_N, the third target clock signal IBCLK_N and the fourth target clock signal QBCLK_N are all active high pulse signals, and the pulse widths of the four target clock signals may all be H2. The first initial clock signal ICLK, the second initial clock signal QCLK, the third initial clock signal IBCLK and the fourth initial clock signal QBCLK are also all active high pulse signals, and the pulse widths of the four initial clock signals may all be H1. For the four target clock signals and the four initial clock signals, the pulse width H2 of the target clock signals is smaller than the pulse width H1 of the initial clock signals.

In addition, as illustrated in FIG. 7, the first target clock signal ICLK_N, the second target clock signal QCLK_N, the third target clock signal IBCLK_N, and the fourth target clock signal QBCLK_N are four non-overlapping clock signals. That is, pulses of the four target clock signals do not overlap. Thus, a serial signal may be outputted by controlling the output of the signal through four non-overlapping target clock signals, thereby realizing the conversion of the parallel data signal into the serial data signal.

With continued reference to FIG. 6, the first initial clock signal ICLK is also inputted to the first buffer module 115, which delays the first initial clock signal and enhances the drive capability of the first initial clock signal to obtain the first delay clock signal ICLK'. That is, the first delay clock signal ICLK' has a slight delay and an enhanced drive capability compared to the first initial clock signal ICLK. The first buffer module 115 may be implemented by two inverters connected in series.

With continued reference to FIG. 6, the third initial clock signal IBCLK is also inputted to the second buffer module 116, which delays the third initial clock signal and enhances the drive capability of the third initial clock signal to obtain the second delay clock signal IBCLK'. That is, the second delay clock signal IBCLK' has a slight delay and an enhanced drive capability compared to the third initial clock signal IBCLK. The second buffer module 116 may also be implemented by two inverters connected in series.

In this way, the initial clock signal and the target clock signal are used for sampling and selecting the initial data signal and the intermediate data signal, to convert the parallel initial data signal into a serial data signal to be processed and convert the parallel intermediate data signal into a serial auxiliary data signal.

Figure 8:
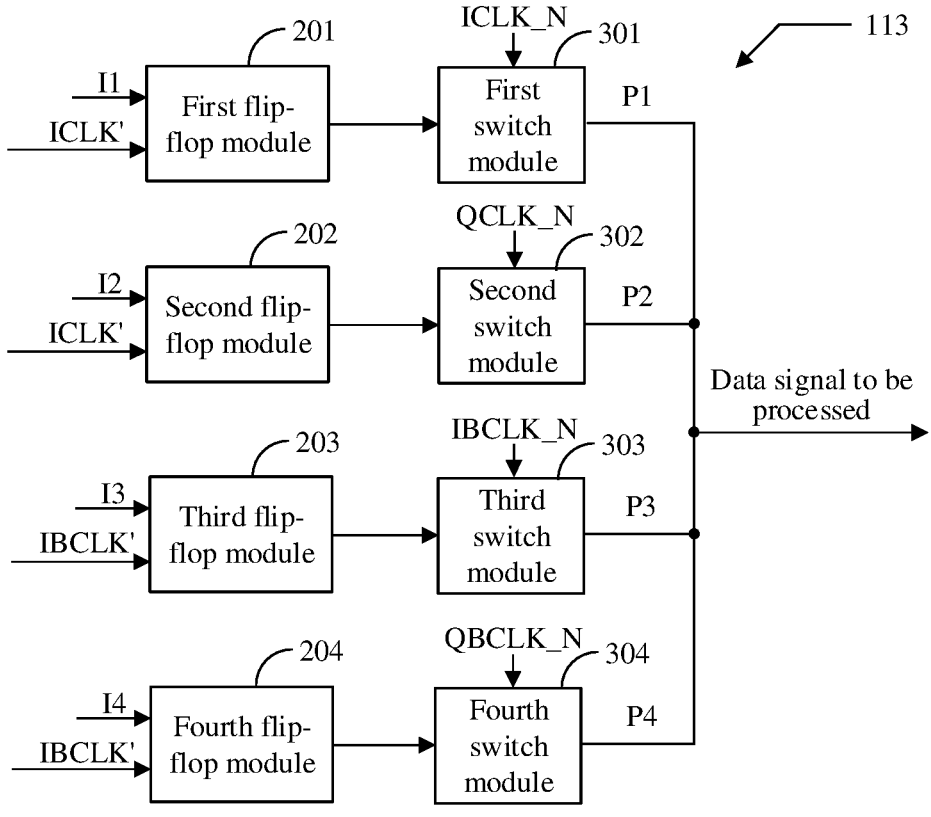
FIG. 8 is a schematic diagram illustrating a composition structure of a second processing module according to an embodiment of the disclosure.

Further, the initial data signal may include a first initial data signal I1, a second initial data signal 12, a third initial data signal 13 and a fourth initial data signal 14. Accordingly, in some embodiments, as illustrated in FIG. 8, the second processing module 113 may include a first flip-flop module 201, a second flip-flop module 202, a third flip-flop module 203, a fourth flip-flop module 204, a first switch module 301, a second switch module 302, a third switch module 303 and a fourth switch module 304.

The first flip-flop module 201 has an input end for receiving the first initial data signal I1, a clock end for receiving the first delay clock signal ICLK', and an output end connected with an input end of the first switch module 301. The first switch module 301 has a control end for receiving the first target clock signal ICLK_N, and an output end for outputting a first data signal to be processed P1 in response to the first target clock signal ICLK_N being in a valid state.

The second flip-flop module 202 has an input end for receiving the second initial data signal 12, a clock end for receiving the first delay clock signal ICLK', and an output end connected with an input end of the second switch module 302. The second switch module 302 has a control end for receiving the second target clock signal QCLK_N, and an output end for outputting a second data signal to be processed P2 in response to the second target clock signal QCLK_N being in a valid state.

The third flip-flop module 203 has an input end for receiving the third initial data signal 13, a clock end for receiving the second delay clock signal IBCLK', and an output end connected with an input end of the third switch module 303. The third switch module 303 has a control end for receiving the third target clock signal IBCLK_N, and an output end for outputting a third data signal to be processed P3 in response to the third target clock signal IBCLK_N being in a valid state.

The fourth flip-flop module 204 has an input end for receiving the fourth initial data signal 14, a clock end for receiving the second delay clock signal IBCLK', and an output end connected with an input end of the fourth switch module 304. The fourth switch module 304 has a control end for receiving the fourth target clock signal QBCLK_N, and an output end for outputting a fourth data signal to be processed P4 in response to the fourth target clock signal QBCLK_N being in a valid state.

The data signal to be processed is composed of the first data signal to be processed P1, the second data signal to be processed P2, the third data signal to be processed P3 and the fourth data signal to be processed P4 in series.

Figure 9:
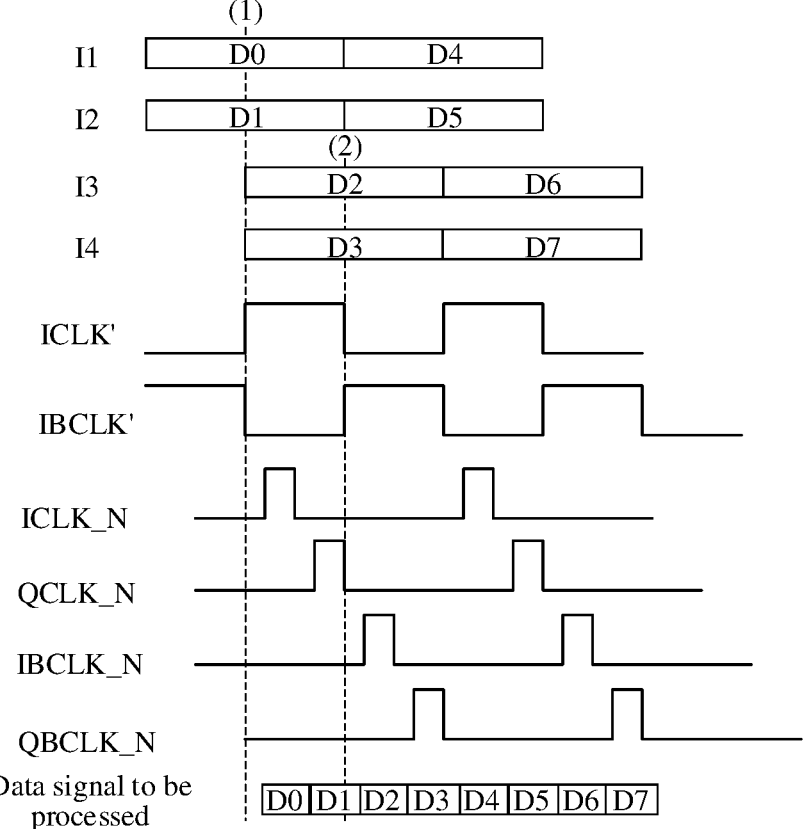
FIG. 9 is a schematic diagram illustrating signal timing according to another embodiment of the disclosure.

FIG. 9 is schematic diagram illustrating signal timing according to another embodiment of the disclosure. As illustrated in FIG. 9, the first initial data signal I1 may include data DO and data D4, the second initial data signal 12 may include data D1 and data D5, the third initial data signal 13 may include data D2 and data D6, and the fourth initial data signal 14 may include data D3 and data D7. The first initial data signal I1, the second initial data signal 12, the third initial data signal 13 and the fourth initial data signal 14 are parallel and compose the initial data signal together.

With reference to FIG. 8 and FIG. 9, the input end of the first flip-flop module 201 receives the first initial data signal I1, and the clock end of the first flip-flop module 201 receives the first delay clock signal ICLK'. The first flip-flop module 201 samples and latches the data DO at the rising edge of the first delay clock signal ICLK' (as illustrated by dashed line (1) in FIG. 9), and samples and latches the data D4 at the next rising edge of the first delay clock signal ICLK'. The first flip-flop module 201 transmits the sampled first initial data signal I1 to the first switch module 301, which is turned on only when the first target clock signal ICLK_N is in a valid state, to output the first data signal to be processed P1 in response to the first target clock signal being in the valid state. The valid state may be a state where the signal is at a high level.

As illustrated in FIG. 9, data DO is outputted at a first pulse of the first target clock signal ICLK_N and data D4 is outputted at a second pulse of the first target clock signal ICLK_N after the first initial data signal I1 is processed by the first flip-flop module 201 and the first switch module 301. The data DO and D4 in the data signal to be processed constitutes the first data signal to be processed P1.

The second initial data signal 12, the third initial data signal 13 and the fourth initial data signal 14 are processed in the same manner according to the respective delay clock signals and the target clock signals, which may be understood with reference to the description of the first initial data signal I1 and will not be repeated herein. In addition, it should be noted that the dotted line (1) in FIG. 9 indicates the rising edge of the first delay clock signal ICLK' for sampling and latching data DO and D1, and the dotted line (2) in FIG. 9 indicates the rising edge of the second delay clock signal IBCLK' for sampling and latching data D2 and D3.

Finally, as illustrated in FIG. 9, the first data signal to be processed P1, the second data signal to be processed P2, the third data signal to be processed P3 and the fourth data signal to be processed P4 are controlled by corresponding target clock signals to be output in sequence, so that the serial data signal to be processed may be obtained.

Figure 10:
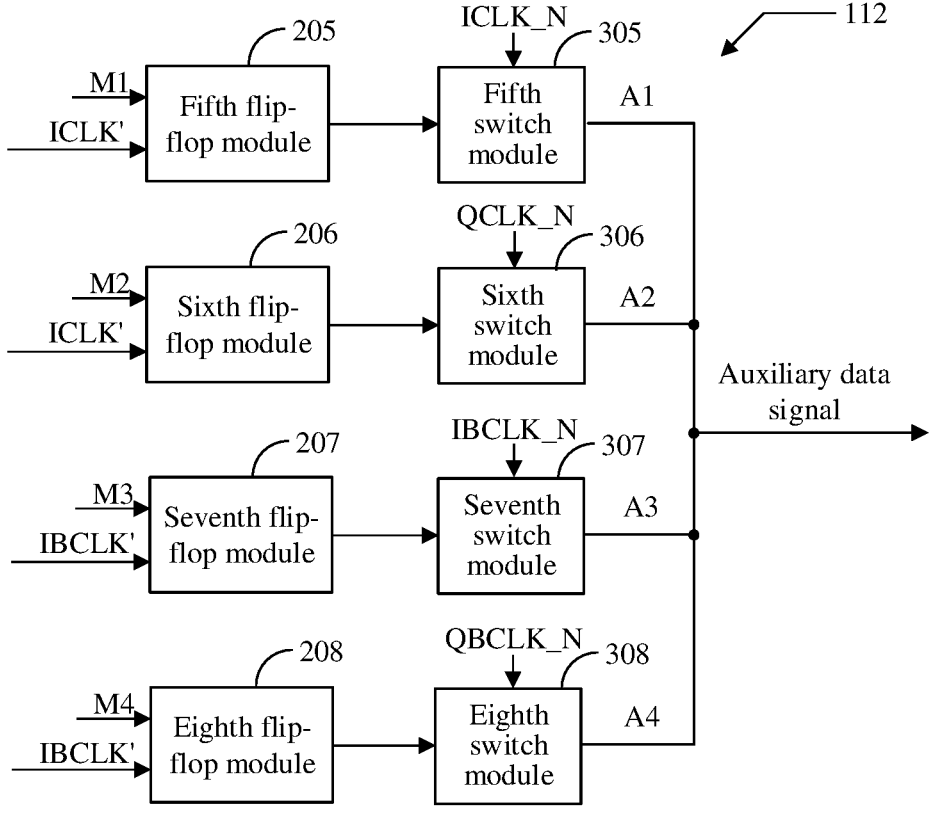
FIG. 10 is a schematic diagram illustrating a composition structure of a first processing module according to an embodiment of the disclosure.

Further, the intermediate data signal may include a first intermediate data signal M1, a second intermediate data signal M2, a third intermediate data signal M3 and a fourth intermediate data signal M4. Accordingly, in some embodiments, as illustrated in FIG. 10, the first processing module 112 may include a fifth flip-flop module 205, a sixth flip-flop module 206, a seventh flip-flop module 207, an eighth flip-flop module 208, a fifth switch module 305, a sixth switch module 306, a seventh switch module 307 and an eighth switch module 308.

The fifth flip-flop module 205 has an input end for receiving the first intermediate data signal M1, a clock end for receiving the first delay clock signal ICLK' and an output end connected with an input end of the fifth switch module 305. The fifth switch module 305 has a control end for receiving the first target clock signal ICLK_N and an output end for outputting a first auxiliary data signal A1 in response to the first target clock signal ICLK_N being in a valid state.

The sixth flip-flop module 206 has an input end for receiving the second intermediate data signal M2, a clock end for receiving the first delay clock signal ICLK', and an output end connected with an input end of the sixth switch module 306. The sixth switch module 306 has a control end for receiving the second target clock signal QCLK_N, and an output end for outputting a second auxiliary data signal A2 in response to the second target clock signal QCLK_N being in a valid state.

The seventh flip-flop module 207 has an input end for receiving the third intermediate data signal M3, a clock end for receiving the second delay clock signal IBCLK', and an output end connected with an input end of the seventh switch module 307. The seventh switch module 307 has a control end for receiving the third target clock signal IBCLK_N, and an output end for outputting a third auxiliary data signal A3 in response to the third target clock signal IBCLK_N being in a valid state.

The eighth flip-flop module 208 has an input end for receiving the fourth intermediate data signal M4, a clock end for receiving the second delay clock signal IBCLK', and an output end connected with an input end of the eighth switch module 308. The eighth switch module 308 has a control end for receiving the fourth target clock signal QBCLK_N, and an output end for outputting a fourth auxiliary data signal A4 in response to the fourth target clock signal QBCLK_N being in a valid state.

The auxiliary data signal is composed of the first auxiliary data signal A1, the second auxiliary data signal A2, the third auxiliary data signal A3 and the fourth auxiliary data signal A4 in series.

It should be noted that the intermediate data signal is generated by shifting the initial data signal to obtain a shifted data signal and inverting the shifted data signal. Therefore, the shifted data signal may include a first shifted data signal, a second shifted data signal, a third shifted data signal and a fourth shifted data signal. Taking FIG. 9 as an example, after the initial data signal is delayed by a preset clock period, the first shifted data signal obtained by delaying the first initial data signal I1 is located at the position of the original second initial data signal 12, the second shifted data signal obtained by delaying the second initial data signal 12 is located at the position of the original third initial data signal 13, the third shifted data signal obtained by delaying the third initial data signal 13 is located at the position of the original fourth initial data signal 14, and the fourth shifted data signal obtained by delaying the fourth initial data signal 14 is delayed by a clock period. The four shifted data signals are inverted to obtain four intermediate data signals.

In the embodiment of the disclosure, the second intermediate data signal M2 is generated according to the first initial data signal I1, the third intermediate data signal M3 is generated according to the second initial data signal 12, and the fourth intermediate data signal is generated according to the third initial data signal 13.

In addition, the first intermediate data signal M1, the second intermediate data signal M2, the third intermediate data signal M3 and the fourth intermediate data signal M4 are sampled and selected with the respective delay clock signals and the target clock signals to implement the conversion from the parallel data signal to the serial data signal, which may be understood with reference to the description of the initial data signal above, and will not be repeated herein.

It can be understood that in the embodiment of the disclosure, each of the first switch module 301, the second switch module 302, the third switch module 303, the fourth switch module 304, the fifth switch module 305, the sixth switch module 306, the seventh switch module 307, and the eighth switch module 308 may be implemented by a transistor, a diode, a field effect transistor or the like.

Figure 11:
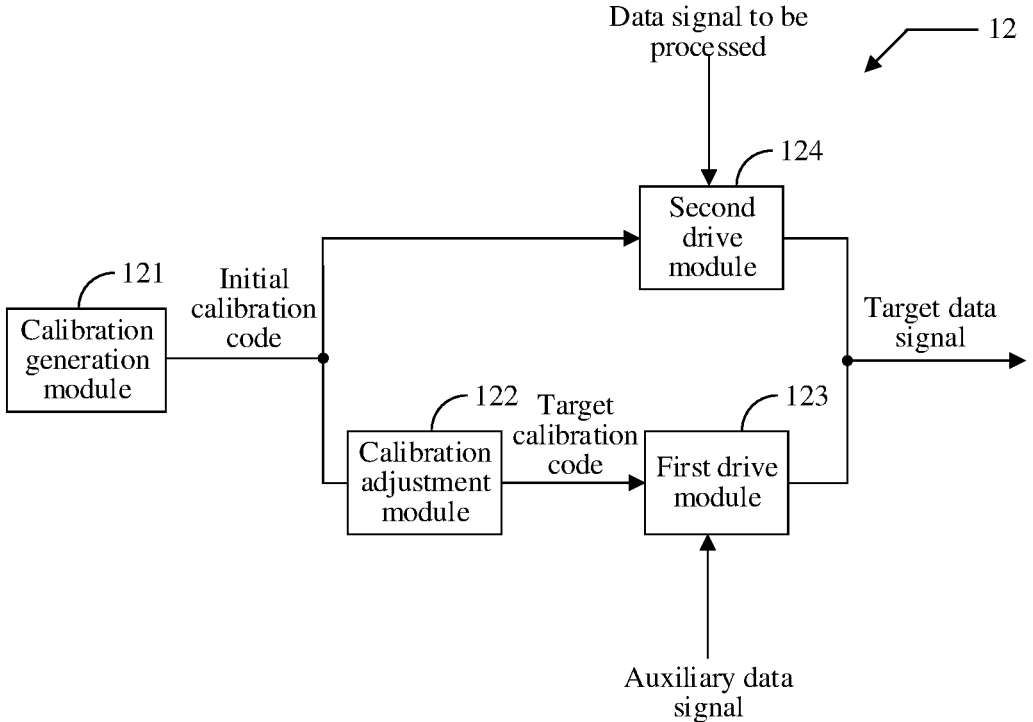
FIG. 11 is a schematic diagram illustrating a composition structure of a drive module according to an embodiment of the disclosure.

Further, in some embodiments, as illustrated in FIG. 11, the drive module 12 may include a calibration generation module 121, a calibration adjustment module 122, a first drive module 123 and a second drive module 124.

The calibration generation module 121 is configured to output the initial calibration code.

The calibration adjustment module 122 is connected with an output end of the calibration generation module 121 and configured to receive the initial calibration code, and adjust the initial calibration code according to the preset scenario, to determine the target calibration code.

The first drive module 123 is connected with an output end of the calibration adjustment module 122 and configured to receive the target calibration code, and adjust a value of a drive resistance of the first drive module 123 according to the target calibration code, to determine a first drive resistance value.

The second drive module 124 is connected with the output end of the calibration generation module 121 and configured to receive the initial calibration code, and adjust a value of a drive resistance of the second drive module 124 according to the initial calibration code, to determine a second drive resistance value.

It should be noted that after obtaining the data signal to be processed and the auxiliary data signal, the two signals are transmitted to the drive module 12 and further processed by the drive module 12 to obtain the target data signal. The drive resistance of the drive module 12 includes the drive resistance of the first drive module 123 and the drive resistance of the second drive module 124, which are controlled by the target calibration code and the initial calibration code respectively.

For example, both the drive resistance of the first drive module 123 and the drive resistance of the second drive module 124 may be formed by multiple resistors with the same resistance value connected in parallel. The resistance value of the second drive module 124 is determined by a Mode Register Set (MRS). The multiple resistors connected in parallel may all have a resistance value of 240 ohm. In a first mode, the MRS may control the value of the drive resistance of the second drive module 124 to be 34 ohms, which is obtained by seven resistors of 240 ohms connected in parallel. In a second mode, the MRS may control the value of the drive resistance of the second drive module 124 to be 40 ohms, which is obtained by six resistors of 240 ohms connected in parallel. In a third mode, the MRS may control the value of the drive resistance of the second drive module 124 to be 48 ohms, which is obtained by five resistors of 240 ohms connected in parallel. However, due to Process, Voltage, Temperature (PVT) condition, the resistance value of the resistor may deviate from 240 ohms, which leads to impedance mismatch. Thus, the drive resistance of the second drive module 124 may be calibrated by generating the initial calibration code (in the embodiment of the disclosure, mainly referring to a ZQ calibration code) that varies with the PVT condition, such that the resistance value of each resistor may be guaranteed to be 240 ohms.

With the increase of operating speed of electronic devices, a swing (SW) of a signal transmitted between the electronic devices decreases, and the signal transmission is affected by external noise to a greater extent. Therefore, in the data processing circuitry 10 provided by the embodiment of the disclosure, the first drive module 123 is configured to perform Feed Forward Equalization (FFE) on the signal processed by the second drive module 124. That is, the signal is compensated and adjusted to change the driving ability of the signal before the signal is transmitted through the channel, to mitigate the impact of the channel loss on the signal transmission performance. Therefore, in the embodiment of the disclosure, the first drive module 123 may also be called an FFE drive module, and the second drive module 124 is equivalent to the output driver 103 in FIG. 1. The degree of compensation and adjustment of the signal by the first drive module 123 may be represented by a FFE coefficient. The drive capability of the first drive module 123 may be changed by adjusting the drive resistance of the first drive module 123, thereby changing the FFE coefficient to achieve different adjustment effects.

Further, the adjustment of the drive resistance of the first drive module 123 is related to a preset scenario. For example, if the preset scenario is subject to high noise interference, the adjustment may be carried out to increase the swing amplitude of the signal and reduce the impact of the channel loss. For another example, if the preset scenario requires a high signal transmission speed, the swing amplitude of the signal may be appropriately reduced to achieve a higher transmission speed on the premise of ensuring that the signal is not disturbed by noise.

Specifically, as illustrated in FIG. 11, the calibration generation module 121 may generate the initial calibration code according to the PVT condition. The initial calibration code is transmitted to the second drive module 124 and the calibration adjustment module 122 respectively. The calibration adjustment module 122 adjusts the initial calibration code according to the preset scenario to obtain a target calibration code, and sends the target calibration code to the first drive module 123. The first drive module 123 adjusts the value of its own drive resistance according to the target calibration code. The drive resistance of the first drive module 123 may be formed by multiple resistors with the same resistance value connected in parallel, and the initial calibration code may make the resistance values of the multiple resistors to be 240 ohms (including a deviation within an error tolerance). The target calibration code is obtained by adjusting the initial calibration code. The target calibration code may make the resistance values of the multiple resistors deviate from 240 ohms, for example, adjusted to 235 ohms or 245 ohms, to obtain the first drive resistance value of the first drive module 123.

The value of the drive resistance of the second drive module 124 may be adjusted according to the initial calibration code. For example, the drive resistance of the second drive module 124 is formed by multiple resistors with the same resistance value connected in parallel. The initial calibration code may make the resistance values of the multiple resistors to be 240 ohms (including a deviation within an error tolerance), to obtain the second drive resistance value of the second drive module 124.

It should also be noted that in the embodiment of the disclosure, composition structures of the first drive module 123 and the second drive module 124 may be the same. Thus, the number of resistors in the first drive module 123 and the second drive module 124 are the same. Since the drive resistance of the first drive module 123 is adjusted based on the target calibration code and the drive resistance of the second drive module 124 is adjusted based on the initial calibration code, the second drive resistance value is a standard resistance value obtained by the MRS and the first drive resistance value is deviated from a preset standard resistance value.

Further, in some embodiments, the first drive module 123 is further configured to receive the auxiliary data signal, and drive the auxiliary data signal according to the first drive resistance value, to generate an auxiliary drive signal.

The second drive module 124 is configured to receive the data signal to be processed, and adjust the drive capability of the data signal to be processed according to the auxiliary drive signal and the second drive resistance value, to generate the target data signal.

As illustrated in FIG. 11, the first drive module 123 determines the value of its own drive resistance to be the first drive resistance value according to the target calibration code, and drives the auxiliary data signal to obtain the auxiliary drive signal after receiving the auxiliary data signal. The second drive module 124 determines the value of its own drive resistance to be the second drive resistance value according to the initial calibration code, drives the data signal to be processed after receiving the data signal to be processed, and adjusts the drive capability of the data signal to be processed in combination with the auxiliary drive signal, to finally obtain the target data signal. That is, the target data signal is obtained by combining the data signal to be processed after the drive processing and the auxiliary drive signal. Therefore, the target data signal has better transmission performance and the impact of the channel loss on the data transmission speed may be mitigated.

Figure 12:
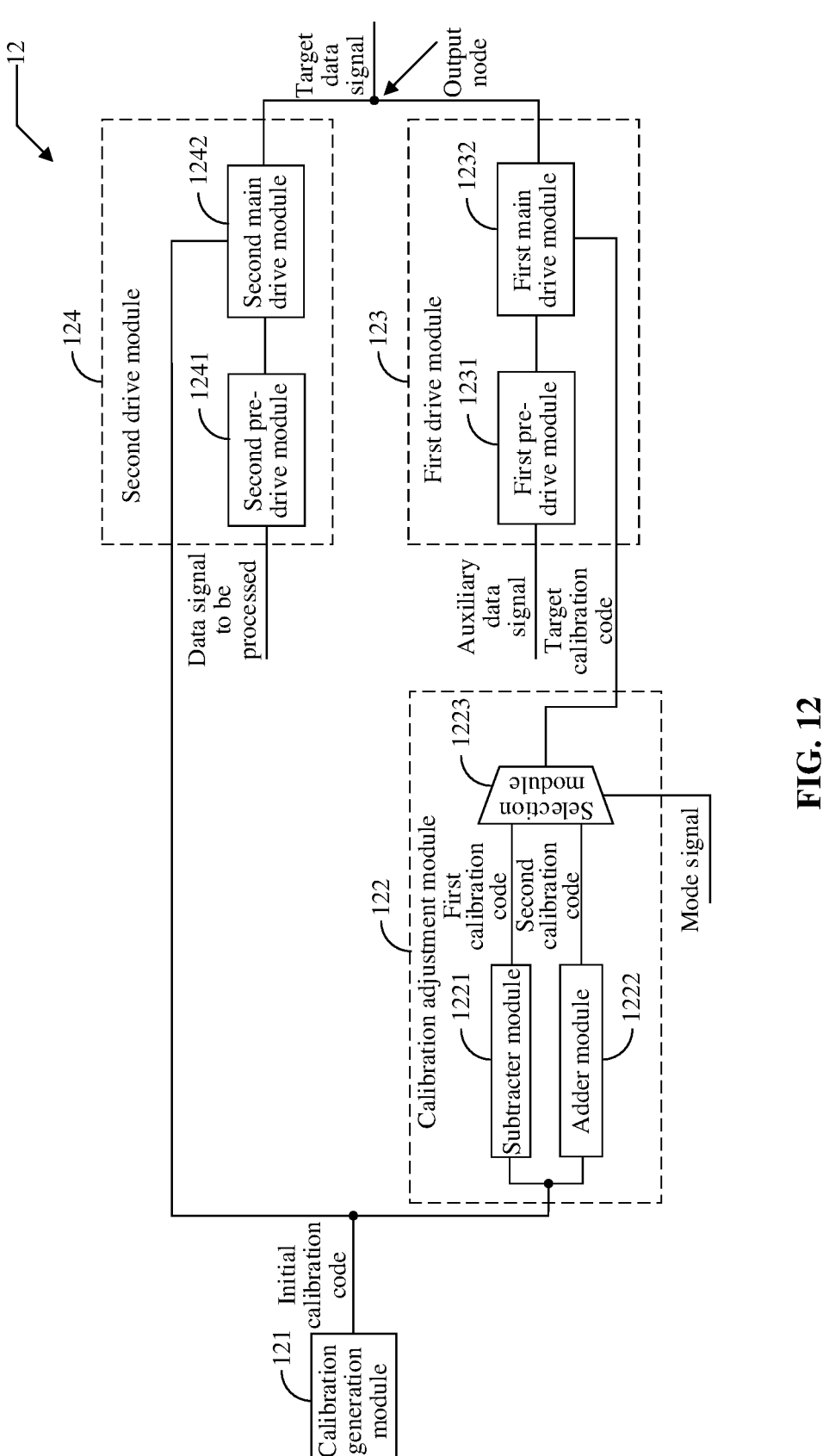
FIG. 12 is a schematic diagram illustrating a composition structure of a drive module according to another embodiment of the disclosure.

As illustrated in FIG. 12, in some embodiments, the calibration adjustment module 122 may include a subtracter module 1221, an adder module 1222 and a selection module 1223.

The subtracter module 1221 is configured to perform subtraction processing on the received initial calibration code, to obtain a first calibration code.

The adder module 1222 is configured to perform addition processing on the received initial calibration code, to obtain a second calibration code.

The selection module 1223 is configured to receive a mode signal, and select the first calibration code or the second calibration code according to the mode signal, to output the target calibration code.

It should be noted that, as illustrated in FIG. 12, a first input end of the selection module 1223 is connected to an end of the subtracter module 1221, and a second input end of the selection module 1223 is connected to an end of the adder module 1222. The other end of the subtracter module 1221 and the other end of the adder module 1222 are both connected to the calibration generation module 121. An output end of the selection module 1223 is connected to the first drive module 123.

It should also be noted that, as illustrated in FIG. 12, the subtracter module 1221 performs subtraction processing on the initial calibration code after receiving the initial calibration code, to obtain the first calibration code. The subtraction processing may be done by subtracting one, two or three from the initial calibration code, and the specific subtracted value may be set according to the preset scenario and the actual requirement. The adder module 1222 performs addition processing on the initial calibration code after receiving the initial calibration code, to obtain the second calibration code. The addition processing may be done by adding one, two or three to the initial calibration code, and the specific added value may be set according to the preset scenario and the actual requirement. The subtracter module 1221 may be implemented by a subtracter and the adder module 1222 may be implemented by an adder.

In addition, the selection module 1223 may receive the mode signal, and after receiving the first calibration code and the second calibration code, select one of the first calibration code and the second calibration code as the target calibration code according to the mode signal. The selection module 1223 may make the selection as follows. The data processing circuitry 10 may be applied to a semiconductor memory, and the specific channel scenario to which the semiconductor memory is applied is not determined until it is formally used. Thus, the data processing circuitry 10 may receive the mode signal in a test mode, select the first calibration code and the second calibration code respectively to adjust the drive capability, compare a channel transmission performance of a target data signal corresponding to the first calibration code with a channel transmission performance of a target data signal corresponding to the second calibration code in the test scenario, and determine the calibration code corresponding to the better performance as the target calibration code. In this way, the target calibration code corresponding to each channel scenario may be obtained by testing in various channel scenarios respectively. In a subsequent selection, the target calibration code corresponding to the channel scenario is selected, so that good data transmission performance can be achieved in various channel scenarios, and the impact of the channel loss on the data transmission speed can be avoided.

In some embodiments, the selection module 1223 is configured to determine the first calibration code as the target calibration code in response to the mode signal having the first value, or determine the second calibration code as the target calibration code in response to the mode signal having the second value.

It should be noted that in the embodiment of the disclosure, the selection module 1223 may be implemented by a one-out-of-two data selector. If the mode signal has a first value, the first calibration code is determined as the target calibration code, and the first value may be one. If the mode signal has a second value, the second calibration code is determined as the target calibration code, and the second value may be zero. Therefore, the target calibration code may be selected.

Further, as illustrated in FIG. 12, in some embodiments, the first drive module 123 may include a first pre-drive module 1231 and a first main drive module 1232, and the second drive module 124 may include a second pre-drive module 1241 and a second main drive module 1242.

The first pre-drive module 1231 has an input end for receiving the auxiliary data signal, and an output end connected with a first end of the first main drive module 1232.

The second pre-drive module 1241 has an input end for receiving the data signal to be processed, and an output end connected with a first end of the second main drive module 1242.

A second end of the first main drive module 1232 is connected with the output end of the calibration adjustment module 122 for receiving the target calibration code. A second end of the second main drive module 1242 is connected with the output end of the calibration generation module 121 for receiving the initial calibration code. A third end of the first main drive module 1232 is connected with a third end of the second main drive module 1242 to form an output node for outputting the target data signal.

The first main drive module 1232 has a drive resistance with the first drive resistance value, and the second main drive module 1242 has a drive resistance with the second drive resistance value.

It should be noted that the output end of the selection module 1223 is the output end of the calibration adjustment module 122 in FIG. 12. The first pre-drive module 1231 pre-drives the auxiliary data signal, and the first main drive module 1232 receives the auxiliary data signal pre-driven by the first pre-drive module 1231 through the first end. The first main drive module 1232 receives the target calibration code through the second end, and adjusts the value of the drive resistance of the first main drive module 1232 to the first drive resistance value according to the target calibration code. That is, the drive resistance of the first drive module 123 mainly refers to the drive resistance of the first main drive module 1232. The auxiliary data signal is driven by the first drive module 123 to obtain the auxiliary drive signal.

The second pre-drive module 1241 pre-drives the data signal to be processed, and the second main drive module 1242 receives the data signal to be processed pre-driven by the second pre-drive module 1241 through the first end. The second main drive module 1242 receives the initial calibration code through the second end, and adjusts the value of the drive resistance of the second main drive module 1242 to the second drive resistance value according to the initial calibration code. That is, the drive resistance of the second drive module 124 mainly refers to the drive resistance of the second main drive module 1242. The second drive module 124 adjusts the drive capability of the data signal to be processed in combination with the auxiliary drive signal to obtain the target data signal.

Thus, the third end of the first main drive module 1232 is connected with the third end of the second main drive module 1242 to form the output node for outputting the target data signal.

Figure 13:
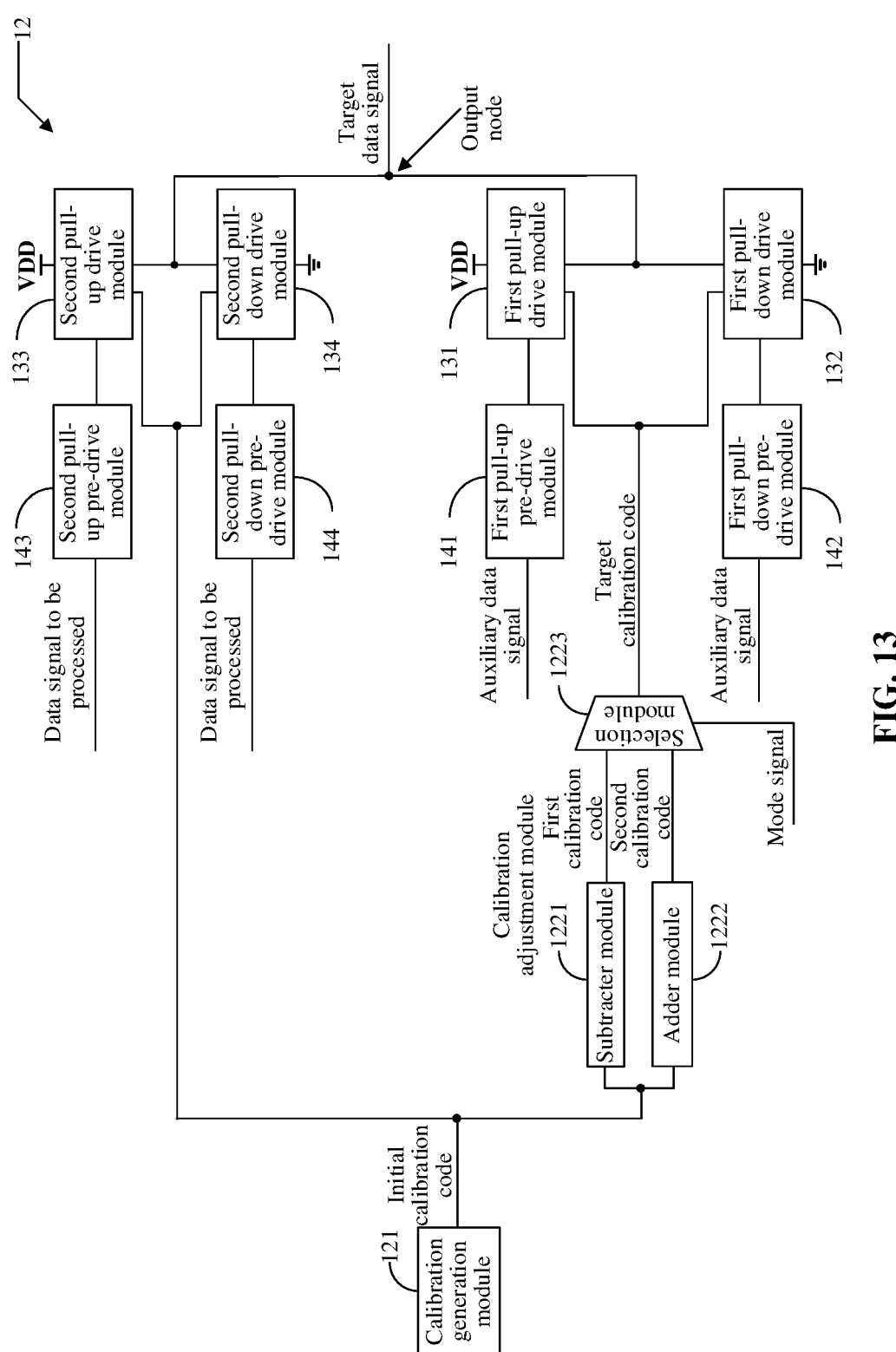
FIG. 13 is a schematic diagram illustrating a composition structure of a drive module according to yet another embodiment of the disclosure.

Further, as illustrated in FIG. 13, in some embodiments, the first main drive module 1232 may include a first pull-up drive module 131 and a first pull-down drive module 132, and the first pre-drive module 1231 may include a first pull-up pre-drive module 141 and a first pull-down pre-drive module 142. The second main drive module 1242 may include a second pull-up drive module 133 and a second pull-down drive module 134, and the second pre-drive module 1241 may include a second pull-up pre-drive module 143 and a second pull-down pre-drive module 144.

A first end of the first pull-up drive module 131 is connected with an output end of the first pull-up pre-drive module 141, a second end of the first pull-up drive module 131 is connected with the output end of the calibration adjustment module 122, and a third end of the first pull-up drive module 131 is connected with a power supply end.

A first end of the first pull-down drive module 132 is connected with an output end of the first pull-down pre-drive module 142, a second end of the first pull-down drive module 132 is connected with the output end of the calibration adjustment module 122, and a fourth end of the first pull-down drive module 132 is connected with a ground end.

A first end of the second pull-up drive module 133 is connected with an output end of the second pull-up pre-drive module 143, a second end of the second pull-up drive module 133 is connected with an output end of the calibration generation module 121, and a third end of the second pull-up drive module 133 is connected with the power supply end.

A first end of the second pull-down drive module 134 is connected with an output end of the second pull-down pre-drive module 144, a second end of the second pull-down drive module 134 is connected with the output end of the calibration generation module 121, and a fourth end of the second pull-down drive module 134 is connected with the ground end.

A fourth end of the first pull-up drive module 131 and a third end of the first pull-down drive module 132 are both connected with the output node, and a fourth end of the second pull-up drive module 134 and a third end of the second pull-down drive module 134 are both connected with the output node.

As illustrated in FIG. 13, the first main drive module 1232 in the first drive module 123 is divided into the first pull-up drive module 131 and the first pull-down drive module 132. The first pre-drive module 1231 in the first drive module 123 is divided into the first pull-up pre-drive module 141 and the first pull-down pre-drive module 142. The second main drive module 1242 in the second drive module 124 is divided into the second pull-up drive module 133 and the second pull-down drive module 134. The second pre-drive module 1241 in the second drive module 124 is divided into the second pull-up pre-drive module 143 and the second pull-down pre-drive module 144.

The first pull-up drive module 131 includes four ends. The first end is connected with the output of the first pull-up pre-drive module 141 to receive the pre-driven auxiliary data signal. The second end is connected with the output end of the calibration adjustment module 122, i.e., the output end of the selection module 1223 for receiving the target calibration code. The value of the drive resistance of the first pull-up drive module 131 is adjusted to deviate from the preset standard resistance value according to the target calibration code. The third end is connected with the power supply end VDD. The fourth end is connected with the output node. The first pull-down drive module 132 also includes four ends. The first end is connected with the output end of the first pull-down pre-drive module 142 to receive the pre-driven auxiliary data signal. The second end is connected with the output end of the calibration adjustment module 122, i.e., the output end of the selection module 1223 for receiving the target calibration code. The value of the drive resistance of the first pull-down drive module 132 is adjusted to deviate from the preset standard resistance value according to the target calibration code. The fourth end is connected with the ground end. The third end is connected with the output node.

The second pull-up drive module 133 also includes four ends. The first end is connected with the output end of the second pull-up pre-drive module 143 to receive the pre-driven data signal to be processed. The second end is connected with the output end of the calibration generation module 121 to receive the initial calibration code. The value of the drive resistance of the second pull-up drive module 133 is adjusted to the standard resistance value set by MRS according to the initial calibration code. The third end is connected to the power supply end VDD. The fourth end is connected to the output node. The second pull-down drive module 134 also includes four ends. The first end is connected to the output end of the second pull-down pre-drive module 144 to receive the pre-driven auxiliary data signal. The second end is connected to the output end of the calibration generation module 121 for receiving the initial calibration code. The value of the drive resistance of the second pull-down drive module 134 is adjusted to the standard resistance value set by MRS according to the initial calibration code. The fourth end is connected with the ground end. The third end is connected to the output node.

As illustrated in FIG. 13, the fourth end of the first pull-up drive module 131 and the third end of the first pull-down drive module 132 are both connected to the output node. The fourth end of the second pull-up drive module 133 and the third end of the second pull-down drive module 134 are both connected to the output node, such that the signal at the output node is the final target data signal.

Further, in some embodiments, as illustrated in FIG. 13, the first drive resistance value may include a first pull-up resistance value corresponding to the first pull-up drive module 131 and a first pull-down resistance value corresponding to the first pull-down drive module 132. The second drive resistance value may include a second pull-up resistance value corresponding to the second pull-up drive module 133 and a second pull-down resistance value corresponding to the second pull-down drive module 134.

The initial calibration code is configured to control the second pull-up resistance value and the second pull-down resistance value to be preset values, respectively. The target calibration code is configured to control the first pull-up resistance value and the first pull-down resistance value to deviate from the preset values, respectively.

It should be noted that the second drive resistance value is controlled by the initial calibration code in the embodiment of the disclosure. Specifically, the drive resistances of the second pull-up drive module 133 and the second pull-down drive module 134 are each formed by multiple resistors with the same resistance value connected in parallel. The initial calibration code may control the resistance value of each resistor to be 240 ohms according to PVT condition, so that the second pull-up resistance value and the second pull-down resistance value are the preset values, respectively. The preset value may be the standard resistance value set by MRS.

It should also be noted that the first drive resistance value is controlled by the target calibration code in the embodiment of the disclosure. Specifically, the drive resistances of the first pull-up drive module 131 and the first pull-down drive module 132 are each formed by multiple resistors connected in parallel. The target calibration code is obtained by adjusting the initial calibration code, and may control the resistance value of each resistor to deviate from 240 ohms, so that the first pull-up resistance value and the first pull-down resistance value are deviated from the preset values, respectively.

In this way, the first pull-up resistance value and the first pull-down resistance value in the first drive module 123 deviate from the preset values, respectively, and the auxiliary data signal is driven to obtain the auxiliary drive signal. The second pull-up resistance value and the second pull-down resistance value in the second drive module 124 are the preset values, respectively, the data signal to be processed is driven, and the drive capability of the data signal to be processed is adjusted in combination with the auxiliary drive signal to obtain the target data signal. The target data signal obtained in this way has a change in the swing amplitude compared to the signal driven by only the second drive module 124, so that the target data signal may adapt to the channel transmission in the preset scenario and the impact of the channel loss on the signal quality may be reduced.

Figure 14:
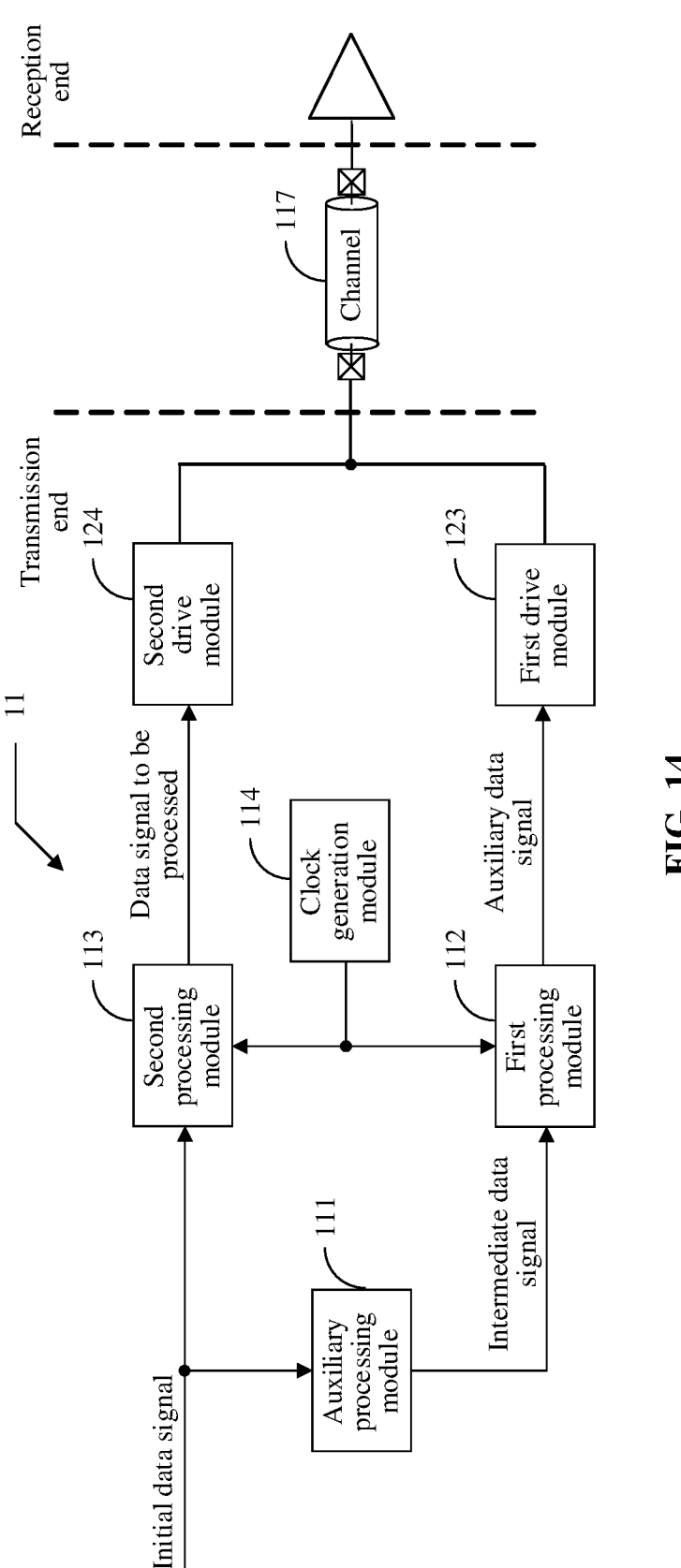
FIG. 14 is a schematic diagram illustrating a composition structure of a data transmission system according to an embodiment of the disclosure.

FIG. 14 is a schematic diagram illustrating a composition structure of a data transmission system according to an embodiment of the disclosure. As illustrated in FIG. 14, the data transmission system includes a transmission end, a channel for transmitting data and a reception end. The left side of the channel 117 is the transmission end of the data transmission system (the transmission end mainly includes a data processing circuitry and a simplified structure diagram of the data processing circuitry 10 is illustrated here), and the right side of the channel 117 is the reception end of the data transmission system (the reception end includes a device for receiving the target data signal, such as a memory controller or other memories). The initial data signal is processed into the intermediate data signal by the auxiliary processing module 111 at the transmission end. Then, the first processing module 112 converts the parallel intermediate data signal into the serial auxiliary data signal according to the clock signals generated by the clock generation module 114, and the second processing module 113 converts the parallel initial data signal into the serial data signal to be processed according to the clock signals generated by the clock generation module 114. The first drive module 123 drives the auxiliary data signal according to the target calibration code to obtain the auxiliary drive signal. The second drive module 124 drives the data signal to be processed according to the initial calibration code, and adjusts the drive capability of the data signal to be processed according to the auxiliary drive signal to finally obtain the target data signal, which is transmitted to the reception end through the channel 117.

The target calibration code is adjusted according to the preset scenario, which represents the current channel environment. Therefore, when the target data signal is transmitted in the current channel environment, the impact of the channel loss on signal quality can be reduced, and better transmission performance can be achieved.

As an example, as illustrated in FIG. 15, (a) is schematic diagram illustrating a signal timing of the data signal to be processed consisting of data D6, D5, D4, D3, D2, D1 and D0. Data D5 is in a high level state and other data are in a low level state. (b) is schematic diagram illustrating a signal timing of the auxiliary data signal. The auxiliary data signal is generated by delaying the initial data signal by a preset clock period and inverting the delayed initial data signal. DiB represents the inverted Di (where i=0, 1, 2, 3, 4, 5, 6). As illustrated in FIG. 15, D5B is in a low level state, and other data in the auxiliary data signal is in a high level state. Here, taking D5B as an example, D5B is generated by delaying D5 by a clock period and inverting the delayed D5.

(c) is schematic diagram illustrating a signal timing of the target data signal. The target data signal is generated by adjusting the drive capability of the initial data signal based on the auxiliary data signal. As illustrated in FIG. 15, SW1 represents a peak-to-peak value (i.e., a swing amplitude) of the target data signal output in the absence of the auxiliary data signal (i.e., the first drive module is turned off, corresponding to FIG. 1). SW2 represents a peak-to-peak value of the target data signal output in the presence of the auxiliary data signal (i.e., the first drive module is turned on, corresponding to FIG. 14). The value of SW2 is slightly larger than the value of SW1 because the drive capability of the data signal to be processed is enhanced by turning on the first drive module.

In FIG. 15, taking the first drive module being turned on as an example, the data signal to be processed is adjusted by the auxiliary data signal. For example, the data D5 is at a high level, and the auxiliary data signal D6B at the corresponding position is at a high level. D5 is compensated by D6B, and the high level corresponding to the target data signal at the corresponding position is slightly higher than the high level corresponding to the data signal to be processed. Similarly, the data D4 is at a low level, and the auxiliary data signal D5B at the corresponding position is at a low level. D4 is compensated by D5B, and the low level corresponding to the target data signal at the corresponding position is slightly lower than the low level corresponding to the data signal to be processed. The data D3 is at a low level, and the auxiliary data signal D4B at the corresponding position is at a high level. D3 is compensated by D4B, and the low level corresponding to the target data signal at the corresponding position is slightly raised. In this way, when the target data signal is transmitted, the peak-to-peak value of the signal is improved, so that the impact of the channel loss on the signal quality can be reduced, and the data transmission speed can be ensured.

In short, in the embodiments of the disclosure, the drive resistance value of the second drive module (the driver in the normal path) may be selected to be 34/40/48 ohms by the initial calibration code, and the drive resistance value may be set by the MRS. In addition, in the calibration adjustment module and the first drive module (FFE path), a subtracter and an adder are used to change the initial calibration code, so that the drive resistance value of the driver in the FFE path is variable. In this way, the variable drive resistance value in the FFE path enables a variable FFE performance, and the optimal FFE coefficients may be found for different channel performance, thereby improving the signal transmission quality.

The embodiment of the disclosure provides a data processing circuitry, and the initial data signal is processed into the data signal to be processed and the auxiliary data signal in the data processing circuitry. The target calibration code is determined based on the preset scenario. Then, the value of the drive resistance of the drive module is adjusted according to the target calibration code, and the driving ability of the data signal to be processed is adjusted according to the auxiliary data signal and the adjusted drive resistance, so that the resulting target data signal is adaptive to the preset scenario. Due to the adjustment of the driving capability of the data signal, the impact of the channel loss on the signal quality can be reduced, and the data transmission speed can be ensured effectively. Moreover, the driving resistance can be adjusted adaptively according to different preset scenarios, which enables the data processing circuitry to adapt to different channel scenarios, thereby improving the channel performance.

FIG. 16 is a schematic flowchart illustrating a data processing method according to an embodiment of the disclosure. As illustrated in FIG. 16, the method includes the following operations.

At S401, an initial data signal is received, and a data signal to be processed and an auxiliary data signal are generated according to the initial data signal.

The initial data signal is a parallel data signal, and the data signal to be processed and the auxiliary data signal are both serial data signals. A phase of the auxiliary data signal is opposite to a phase of the data signal to be processed and the auxiliary data signal is delayed from the data signal to be processed by a preset clock period.

At S402, an initial calibration code is adjusted according to a preset scenario, to obtain a target calibration code.

At S403, a value of a drive resistance of a drive module is adjusted according to the target calibration code, and a drive capability of the data signal to be processed is adjusted according to the auxiliary data signal and the adjusted drive resistance, to generate a target data signal.

It should be noted that the embodiment of the disclosure provides a data processing method, in particular provides an adaptive method for improving a transmission performance of a semiconductor memory. The method may be applied to the data processing circuitry described in any one of the preceding embodiments, and the data processing circuitry includes a preprocessing module and a drive module. Operation S401 is performed by the preprocessing module, and operations S402 and S403 are performed by the drive module.

In some embodiments, the operation that the initial data signal is received and the data signal to be processed and the auxiliary data signal are generated according to the initial data signal may include the following operations.

The initial data signal is received, shifted and inverted by an auxiliary processing module, to obtain an intermediate data signal.

The intermediate data signal is received and converted from a parallel data signal to a serial data signal by a first processing module, to output the auxiliary data signal.

The initial data signal is received and converted from a parallel data signal to a serial data signal by a second processing module, to output the data signal to be processed.

In some embodiments, the operation that the initial data signal is received, shifted and inverted by the auxiliary processing module to obtain the intermediate data signal may include the following operations.

The initial data signal is shifted by a register module to obtain a shifted data signal.

The shifted data signal is inverted by an inverter module to obtain the intermediate data signal.

In some embodiments, the shifted data signal is delayed from the initial data signal by a preset clock period.

In some embodiments, the method may further include the following operations.

A first initial clock signal, a second initial clock signal, a third initial clock signal and a fourth initial clock signal are received and a first target clock signal, a second target clock signal, a third target clock signal and a fourth target clock signal are generated by a clock generation module.

The first initial clock signal is delayed and a drive capability of the first initial clock signal is enhanced by a first buffer module, to obtain a first delay clock signal.

The third initial clock signal is delayed and a drive capability of the third initial clock signal is enhanced by a second buffer module, to obtain a second delay clock signal.

In the embodiment of the disclosure, phases of the first initial clock signal, the second initial clock signal, the third initial clock signal and the fourth initial clock signal are 0 degree, 90 degree, 180 degree and 270 degree respectively. The first target clock signal is generated from a rising edge of the first initial clock signal, and a pulse width of the first target clock signal is smaller than a pulse width of the first initial clock signal. The second target clock signal is generated from a rising edge of the second initial clock signal, and a pulse width of the second target clock signal is smaller than a pulse width of the second initial clock signal. The third target clock signal is generated from a rising edge of the third initial clock signal, and a pulse width of the third target clock signal is smaller than a pulse width of the third initial clock signal. The fourth target clock signal is generated from a rising edge of the fourth initial clock signal, and a pulse width of the fourth target clock signal is smaller than a pulse width of the fourth initial clock signal.

In some embodiments, the initial data signal includes a first initial data signal, a second initial data signal, a third initial data signal, and a fourth initial data signal. The operation that the data signal to be processed is generated according to the initial data signal may include the following operations.

The first initial data signal, the first delay clock signal and the first target clock signal are received by a first flip-flop module. The first initial data signal is sampled according to the first delay clock signal, and a first data signal to be processed is outputted in response to the first target clock signal being in a valid state.

The second initial data signal, the first delay clock signal and the second target clock signal are received by a second flip-flop module. The second initial data signal is sampled according to the first delay clock signal, and a second data signal to be processed is outputted in response to the second target clock signal being in a valid state.

The third initial data signal, the second delay clock signal and the third target clock signal are received by a third flip-flop module. The third initial data signal is sampled according to the second delay clock signal, and a third data signal to be processed is outputted in response to the third target clock signal being in a valid state.

The fourth initial data signal, the second delay clock signal and the fourth target clock signal are received by a fourth flip-flop module. The fourth initial data signal is sampled according to the second delay clock signal, and a fourth data signal to be processed is outputted in response to the fourth target clock signal being in a valid state.

The data signal to be processed is composed of the first data signal to be processed, the second data signal to be processed, the third data signal to be processed and the fourth data signal to be processed in series.

In some embodiments, the intermediate data signal may include a first intermediate data signal, a second intermediate data signal, a third intermediate data signal, and a fourth intermediate data signal. The operation that the auxiliary data signal is generated according to the initial data signal may include the following operations.

The first intermediate data signal, the first delay clock signal and the first target clock signal are received by a fifth flip-flop module. The first intermediate data signal is sampled according to the first delay clock signal, and a first auxiliary data signal is outputted in response to the first target clock signal being in a valid state.

The second intermediate data signal, the first delay clock signal and the second target clock signal are received by a sixth flip-flop module. The second intermediate data signal is sampled according to the first delay clock signal, and a second auxiliary data signal is outputted in response to the second target clock signal being in a valid state.

The third intermediate data signal, the second delay clock signal and the third target clock signal are received by a seventh flip-flop module. The third intermediate data signal is sampled according to the second delay clock signal, and a third auxiliary data signal is outputted in response to the third target clock signal being in a valid state.

The fourth intermediate data signal, the second delay clock signal and the fourth target clock signal are received by an eighth flip-flop module. The fourth intermediate data signal is sampled according to the second delay clock signal, and a fourth auxiliary data signal is outputted in response to the fourth target clock signal being in a valid state.

The auxiliary data signal is composed of the first auxiliary data signal, the second auxiliary data signal, the third auxiliary data signal and the fourth auxiliary data signal in series.

In some embodiments, the method may further include outputting the initial calibration code by a calibration generation module.

Accordingly, the operation that the value of the drive resistance of the drive module is adjusted according to the target calibration code may include the following operation.

The initial calibration code is received and adjusted according to a preset scenario by a calibration adjustment module, to determine the target calibration code.

Accordingly, the operation that the value of the drive resistance of the drive module is adjusted according to the target calibration code may include the following operations.

The target calibration code is received by a first drive module, and a value of a drive resistance of the first drive module is adjusted according to the target calibration code, to determine a first drive resistance value.

The initial calibration code is received by a second drive module, and a value of a drive resistance of the second drive module is adjusted according to the initial calibration code, to determine a second drive resistance value.

In some embodiments, the operation that the drive capability of the data signal to be processed is adjusted according to the auxiliary drive signal and the adjusted drive resistance, to generate the target data signal may include the following operations.

The auxiliary data signal is received and driven according to the first drive resistance value by the first drive module, to generate an auxiliary drive signal.

The data signal to be processed is received and the drive capability of the data signal to be processed is adjusted according to the auxiliary drive signal and the second drive resistance value by the second drive module, to generate the target data signal.

In some embodiments, the operation that the initial calibration code is adjusted to determine the target calibration code may include the following operations.

Subtraction processing is performed on the initial calibration code to obtain a first calibration code.

Addition processing is performed on the initial calibration code to obtain a second calibration code.

A mode signal is received, and the first calibration code or the second calibration code is selected according to the mode signal, to determine the target calibration code.

In some embodiments, the operation that the first calibration code or the second calibration code is selected according to the mode signal to determine the target calibration code may include one of the following operations.

The first calibration code is determined as the target calibration code in response to the mode signal having a first value.

The second calibration code is determined as the target calibration code in response to the mode signal having a second value.

In a specific embodiment, the operation that the drive capability of the data signal to be processed is adjusted according to the auxiliary data signal and the adjusted drive resistance, to generate the target data signal may include the following operations.

The auxiliary data signal is received and pre-driven by a first pre-drive module to obtain a pre-driven auxiliary data signal.

The data signal to be processed is received and pre-driven by a second pre-drive module to obtain a pre-driven data signal to be processed.

The target calibration code is received and the pre-driven auxiliary data signal is driven according to the target calibration code by a first main drive module, to obtain an auxiliary drive signal.

The initial calibration code is received and the drive capability of the data signal to be processed is adjusted according to the initial calibration code and the auxiliary drive signal by a second main drive module, to obtain the target data signal.

The drive resistance of the first main drive module has the first drive resistance value, and the drive resistance of the second main drive module has the second drive resistance value.

In the embodiment of the disclosure, the first drive resistance value may include a first pull-up resistance value corresponding to a first pull-up drive module and a first pull-down resistance value corresponding to a first pull-down drive module. The second drive resistance value may include a second pull-up resistance value corresponding to a second pull-up drive module and a second pull-down resistance value corresponding to a second pull-down drive module. The initial calibration code is used for controlling the second pull-up resistance value and the second pull-down resistance value to preset values, respectively. The target calibration code is used for controlling the first pull-up resistance value and the first pull-down resistance value to deviate from the preset values, respectively.

Details not disclosed in the embodiments of the disclosure are understood with reference to the description of the preceding embodiments.

The embodiment of the disclosure provides a data processing method, the initial data signal is received and processed into the data signal to be processed and the auxiliary data signal. The initial data signal is a parallel data signal, and the data signal to be processed and the auxiliary data signal are both serial data signals. A phase of the auxiliary data signal is opposite to a phase of the data signal to be processed and the auxiliary data signal is delayed from the data signal to be processed by a preset clock period. The initial calibration code is adjusted according to the preset scenario, to obtain the target calibration code. The value of the drive resistance of the drive module is adjusted according to the target calibration code. The drive capability of the data signal to be processed is adjusted according to the auxiliary data signal and the adjusted drive resistance, to generate the target data signal. In this way, the driving capability of the data signal to be processed is adjusted according to the auxiliary drive signal and the adjusted drive resistance value, so that the impact of the channel loss on signal quality can be reduced, and a data transmission speed can be ensured effectively. Moreover, the driving resistance is adjusted adaptively according to different preset scenarios, which enables the data processing circuitry to adapt to different channel scenarios, thereby improving the channel performance.

Figure 17:
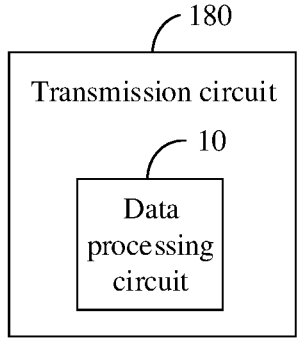
FIG. 17 is a schematic diagram illustrating a composition structure of a transmission circuitry according to an embodiment of the disclosure.

FIG. 17 is a schematic diagram illustrating a composition structure of a transmission circuitry according to an embodiment of the disclosure. As illustrated in FIG. 17, the transmission circuitry 180 may include at least the data processing circuitry 10 described in any one of the foregoing embodiments.

In the embodiment of the disclosure, since the transmission circuitry 180 includes the above-mentioned data processing circuitry 10, when transmitting data, the drive resistance is adaptively adjusted according to different preset scenarios, thereby improving the performance of the transmission channel. The data processing circuitry can also be adapted to different channel scenarios, and the data transmission speed can be ensured effectively.

Figure 18:
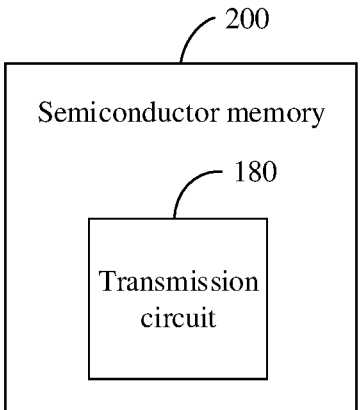
FIG. 18 is a schematic diagram illustrating a composition structure of a semiconductor memory according to an embodiment of the disclosure.

FIG. 18 is a schematic diagram illustrating a composition structure of a semiconductor memory 200 according to an embodiment of the disclosure. As illustrated in FIG. 18, the semiconductor memory 200 may include at least the transmission circuitry 180 described in any one of the foregoing embodiments.

In some embodiments, the semiconductor memory 200 is a dynamic random access memory (DRAM) chip and conforms to a DDR5 memory specification.

In the embodiment of the disclosure, since the semiconductor memory 200 includes the transmission circuitry 180 described above, the semiconductor memory can be adapted to a higher memory specification such as DDR4/LPDDR4, DDR5/LPDDR5 or DDR6/LPDDR6. The performance of the transmission channel is improved, thus the data transmission speed can be effectively ensured, and data transmission performance is better.

Further, it should be noted that the modules or units in the data processing circuitry according to the embodiments of the disclosure can be implemented by hardware such as circuits.

The above description merely describes the preferred embodiments of the disclosure and is not intended to limit the scope of protection of the disclosure.

It should be noted that, in the disclosure, the terms "comprising", "including" or any other variations thereof are intended to cover non-exclusive inclusion, so that a process, method, object or apparatus which includes a series of elements includes not only those elements but also other elements that are not explicitly listed, or elements inherent to the process, method, object or apparatus. Without further limitations, an element defined by the phrase "including a . . . " does not exclude the existence of another identical element in the process, method, object or apparatus which includes the element.

The above serial numbers of the embodiments of the disclosure are used for description only and do not represent the advantages and disadvantages of the embodiments.

The methods disclosed in several method embodiments provided in the disclosure may be arbitrarily combined to obtain new method embodiments without conflicting with each other The features disclosed in several product embodiments provided in the disclosure may be arbitrarily combined to obtain new product embodiments without conflicting with each other.

The features disclosed in several method or device embodiments provided in the disclosure may be arbitrarily combined to obtain new method embodiments or device embodiments without conflicting with each other.

The above descriptions are only the specific implementations of the disclosure, and the scope of protection of the disclosure is not limited thereto. Any modification or variation readily conceivable by a person skilled in the art within the technical scope disclosed in the disclosure should be covered within the scope of protection of the disclosure. Therefore, the scope of protection of the disclosure shall be subject to the scope of protection of the claims.

The embodiments of the disclosure provide a data processing circuitry, a data processing method, a transmission circuitry and a semiconductor memory. The data processing circuitry includes a preprocessing module and a drive module. The preprocessing module is configured to receive an initial data signal and generate a data signal to be processed and an auxiliary data signal according to the initial data signal. The initial data signal is a parallel data signal, and the data signal to be processed and the auxiliary data signal are both serial data signals. A phase of the auxiliary data signal is opposite to a phase of the data signal to be processed and the auxiliary data signal is delayed from the data signal to be processed by a preset clock period. The drive module is connected with the preprocessing module and configured to: adjust an initial calibration code according to a preset scenario, to obtain a target calibration code; adjust a value of a drive resistance of the drive module according to the target calibration code; and adjust a drive capability of the data signal to be processed according to the auxiliary data signal and the adjusted drive resistance, to generate a target data signal. In this way, the initial data signal is processed into the data signal to be processed and the auxiliary data signal. The target calibration code is determined based on the preset scenario. Then, the value of the drive resistance of the drive module is adjusted according to the target calibration code, and the driving ability of the data signal to be processed is adjusted according to the auxiliary data signal and the adjusted drive resistance, so that the resulting target data signal is adaptive to the preset scenario. Due to the adjustment of the driving capability of the data signal, the impact of the channel loss on the signal quality can be reduced, and the data transmission speed can be ensured effectively. Moreover, the driving resistance can be adjusted adaptively according to different preset scenarios, which enables the data processing circuitry to adapt to different channel scenarios, thereby improving the channel performance.

What is claimed is:

1. A data processing circuitry, comprising:

a preprocessing circuit, configured to: receive an initial data signal, and generate a data signal to be processed and an auxiliary data signal according to the initial data signal, wherein the initial data signal is a parallel data signal, the data signal to be processed and the auxiliary data signal are both serial data signals, a phase of the auxiliary data signal is opposite to a phase of the data signal to be processed and the auxiliary data signal is delayed from the data signal to be processed by a preset clock period; and a drive circuit, connected with the preprocessing circuit and configured to: adjust an initial calibration code according to a preset scenario, to obtain a target calibration code; adjust a value of a drive resistance of the drive circuit according to the target calibration code; and adjust a drive capability of the data signal to be processed according to the auxiliary data signal and the adjusted drive resistance, to generate a target data signal;

wherein the preprocessing circuit comprises:

an auxiliary processing circuit, configured to: receive the initial data signal, and shift and invert the initial data signal, to obtain an intermediate data signal;

a first processing circuit, connected with the auxiliary processing circuit and configured to: receive the intermediate data signal, and convert the intermediate data signal from a parallel data signal to a serial data signal, to output the auxiliary data signal; and a second processing circuit, configured to: receive the initial data signal, and convert the initial data signal from the parallel data signal to a serial data signal, to output the data signal to be processed;

wherein the preprocessing circuit further comprises:

a clock generator, configured to: receive a first initial clock signal, a second initial clock signal, a third initial clock signal and a fourth initial clock signal, and generate a first target clock signal, a second target clock signal, a third target clock signal and a fourth target clock signal, wherein phases of the first initial clock signal, the second initial clock signal, the third initial clock signal and the fourth initial clock signal are 0 degree, 90 degree, 180 degree and 270 degree respectively;

the first target clock signal is generated from a rising edge of the first initial clock signal, and a pulse width of the first target clock signal is smaller than a pulse width of the first initial clock signal;

the second target clock signal is generated from a rising edge of the second initial clock signal, and a pulse width of the second target clock signal is smaller than a pulse width of the second initial clock signal;

the third target clock signal is generated from a rising edge of the third initial clock signal, and a pulse width of the third target clock signal is smaller than a pulse width of the third initial clock signal; and the fourth target clock signal is generated from a rising edge of the fourth initial clock signal, and a pulse width of the fourth target clock signal is smaller than a pulse width of the fourth initial clock signal;

a first buffer circuit, configured to delay the first initial clock signal and enhance a drive capability of the first initial clock signal, to obtain a first delay clock signal; and a second buffer circuit, configured to delay the third initial clock signal and enhance a drive capability of the third initial clock signal, to obtain a second delay clock signal.

2. The data processing circuitry of claim 1, wherein the auxiliary processing circuit comprises a register circuit and an inverter circuit, an output end of the register circuit is connected to an input end of the inverter circuit, and an output end of the inverter circuit is connected to the first processing circuit, wherein the register circuit is configured to shift the initial data signal to obtain a shifted data signal; and the inverter circuit is configured to invert the shifted data signal to obtain the intermediate data signal.

3. The data processing circuitry of claim 2, wherein the shifted data signal is delayed from the initial data signal by a preset clock period.

4. The data processing circuitry of claim 1, wherein the initial data signal comprises a first initial data signal, a second initial data signal, a third initial data signal, and a fourth initial data signal; and the second processing circuit comprises a first flip-flop circuit, a second flip-flop circuit, a third flip-flop circuit, a fourth flip-flop circuit, a first switch circuit, a second switch circuit, a third switch circuit and a fourth switch circuit, wherein the first flip-flop circuit has an input end for receiving the first initial data signal, a clock end for receiving the first delay clock signal, and an output end connected with an input end of the first switch circuit; and the first switch circuit has a control end for receiving the first target clock signal, and an output end for outputting a first data signal to be processed in response to the first target clock signal being in a valid state;

the second flip-flop circuit has an input end for receiving the second initial data signal, a clock end for receiving the first delay clock signal, and an output end connected with an input end of the second switch circuit; and the second switch circuit has a control end for receiving the second target clock signal, and an output end for outputting a second data signal to be processed in response to the second target clock signal being in a valid state;

the third flip-flop circuit has an input end for receiving the third initial data signal, a clock end for receiving the second delay clock signal, and an output end connected with an input end of the third switch circuit; and the third switch circuit has a control end for receiving the third target clock signal, and an output end for outputting a third data signal to be processed in response to the third target clock signal being in a valid state; and the fourth flip-flop circuit has an input end for receiving the fourth initial data signal, a clock end for receiving the second delay clock signal, and an output end connected with an input end of the fourth switch circuit; and the fourth switch circuit has a control end for receiving the fourth target clock signal, and an output end for outputting a fourth data signal to be processed in response to the fourth target clock signal being in a valid state; and wherein the data signal to be processed is composed of the first data signal to be processed, the second data signal to be processed, the third data signal to be processed and the fourth data signal to be processed in series.

5. The data processing circuitry of claim 1, wherein the intermediate data signal comprises a first intermediate data signal, a second intermediate data signal, a third intermediate data signal, and a fourth intermediate data signal; and the first processing circuit comprises a fifth flip-flop circuit, a sixth flip-flop circuit, a seventh flip-flop circuit, an eighth flip-flop circuit, a fifth switch circuit, a sixth switch circuit, a seventh switch circuit and an eighth switch circuit, wherein the fifth flip-flop circuit has an input end for receiving the first intermediate data signal, a clock end for receiving the first delay clock signal, and an output end connected with an input end of the fifth switch circuit; and the fifth switch circuit has a control end for receiving the first target clock signal, and an output end for outputting a first auxiliary data signal in response to the first target clock signal being in a valid state;

the sixth flip-flop circuit has an input end for receiving the second intermediate data signal, a clock end for receiving the first delay clock signal, and an output end connected with an input end of the sixth switch circuit; and the sixth switch circuit has a control end for receiving the second target clock signal, and an output end for outputting a second auxiliary data signal in response to the second target clock signal being in a valid state;

the seventh flip-flop circuit has an input end for receiving the third intermediate data signal, a clock end for receiving the second delay clock signal, and an output end connected with an input end of the seventh switch circuit; and the seventh switch circuit has a control end for receiving the third target clock signal, and an output end for outputting a third auxiliary data signal in response to the third target clock signal being in a valid state; and the eighth flip-flop circuit has an input end for receiving the fourth intermediate data signal, a clock end for receiving the second delay clock signal, and an output end connected with an input end of the eighth switch circuit; and the eighth switch circuit has a control end for receiving the fourth target clock signal, and an output end for outputting a fourth auxiliary data signal in response to the fourth target clock signal being in a valid state, and wherein the auxiliary data signal is composed of the first auxiliary data signal, the second auxiliary data signal, the third auxiliary data signal and the fourth auxiliary data signal in series.

6. The data processing circuitry of claim 1, wherein the drive circuit comprises:

a calibration generation circuit, configured to output the initial calibration code;

a calibration adjustment circuit, connected with an output end of the calibration generation circuit and configured to: receive the initial calibration code, and adjust the initial calibration code according to the preset scenario, to determine the target calibration code;

a first drive circuit, connected with an output end of the calibration adjustment circuit and configured to: receive the target calibration code, and adjust a value of a drive resistance of the first drive circuit according to the target calibration code, to determine a first drive resistance value; and a second drive circuit, connected with the output end of the calibration generation circuit and configured to: receive the initial calibration code, and adjust a value of a drive resistance of the second drive circuit according to the initial calibration code, to determine a second drive resistance value.

7. The data processing circuitry of claim 6, wherein the first drive circuit is further configured to: receive the auxiliary data signal, and drive the auxiliary data signal according to the first drive resistance value, to generate an auxiliary drive signal; and the second drive circuit is further configured to: receive the data signal to be processed, and adjust the drive capability of the data signal to be processed according to the auxiliary drive signal and the second drive resistance value, to generate the target data signal.

8. The data processing circuitry of claim 6, wherein the calibration adjustment circuit comprises a subtracter, an adder and a selector; a first input end of the selector is connected with an end of the subtracter, a second input end of the selector is connected with an end of the adder, another end of the subtracter and another end of the adder are both connected with the calibration generation circuit, and an output end of the selector is connected with the first drive circuit, wherein the subtracter is configured to perform subtraction processing on the received initial calibration code, to obtain a first calibration code;

the adder is configured to perform addition processing on the received initial calibration code, to obtain a second calibration code; and the selector is configured to receive a mode signal, and select the first calibration code or the second calibration code according to the mode signal, to output the target calibration code.

9. The data processing circuitry of claim 8, wherein the selector is further configured to:

determine, in response to the mode signal having a first value, the first calibration code as the target calibration code; or determine, in response to the mode signal having a second value, the second calibration code as the target calibration code.

10. The data processing circuitry of claim 7, wherein the first drive circuit comprises a first pre-drive circuit and a first main drive circuit, and the second drive circuit comprises a second pre-drive circuit and a second main drive circuit, wherein the first pre-drive circuit has an input end for receiving the auxiliary data signal, and an output end connected with a first end of the first main drive circuit;

the second pre-drive circuit has an input end for receiving the data signal to be processed, and an output end connected with a first end of the second main drive circuit; and a second end of the first main drive circuit is connected with the output end of the calibration adjustment circuit for receiving the target calibration code; a second end of the second main drive circuit is connected with the output end of the calibration generation circuit for receiving the initial calibration code; and a third end of the first main drive circuit is connected with a third end of the second main drive circuit to form an output node for outputting the target data signal, and wherein the first main drive circuit has a drive resistance with the first drive resistance value, and the second main drive circuit has a drive resistance with the second drive resistance value.

11. The data processing circuitry of claim 10, wherein the first main drive circuit comprises a first pull-up drive circuit and a first pull-down drive circuit, and the first pre-drive circuit comprises a first pull-up pre-drive circuit and a first pull-down pre-drive circuit; the second main drive circuit comprises a second pull-up drive circuit and a second pull-down drive circuit, and the second pre-drive circuit comprises a second pull-up pre-drive circuit and a second pull-down pre-drive circuit; wherein a first end of the first pull-up drive circuit is connected with an output end of the first pull-up pre-drive circuit, a second end of the first pull-up drive circuit is connected with the output end of the calibration adjustment circuit, and a third end of the first pull-up drive circuit is connected with a power supply end;

a first end of the first pull-down drive circuit is connected with an output end of the first pull-down pre-drive circuit, a second end of the first pull-down drive circuit is connected with the output end of the calibration adjustment circuit, and a fourth end of the first pull-down drive circuit is connected with a ground end;

a first end of the second pull-up drive circuit is connected with an output end of the second pull-up pre-drive circuit, a second end of the second pull-up drive circuit is connected with the output end of the calibration generation circuit, and a third end of the second pull-up drive circuit is connected with the power supply end;

a first end of the second pull-down drive circuit is connected with an output end of the second pull-down pre-drive circuit, a second end of the second pull-down drive circuit is connected with the output end of the calibration generation circuit, and a fourth end of the second pull-down drive circuit is connected with the ground end; and a fourth end of the first pull-up drive circuit and a third end of the first pull-down drive circuit are both connected with the output node; and a fourth end of the second pull-up drive circuit and a third end of the second pull-down drive circuit are both connected with the output node.

12. The data processing circuitry of claim 11, wherein the first drive resistance value comprises a first pull-up resistance value corresponding to the first pull-up drive circuit and a first pull-down resistance value corresponding to the first pull-down drive circuit;

the second drive resistance value comprises a second pull-up resistance value corresponding to the second pull-up drive circuit and a second pull-down resistance value corresponding to the second pull-down drive circuit, and the initial calibration code is configured to control the second pull-up resistance value and the second pull-down resistance value to be preset values, respectively; and the target calibration code is configured to control the first pull-up resistance value and the first pull-down resistance value to deviate from the preset values, respectively.

13. A data processing method performed with the data processing circuitry of claim 1, comprising:

receiving the initial data signal;

generating the data signal to be processed and the auxiliary data signal according to the initial data signal;

adjusting the initial calibration code according to the preset scenario, to obtain the target calibration code;

adjusting the value of a drive resistance of the drive circuit according to the target calibration code; and adjusting the drive capability of the data signal to be processed according to the auxiliary data signal and the adjusted drive resistance, to generate the target data signal.

14. The data processing method of claim 13, wherein receiving the initial data signal and generating the data signal to be processed and the auxiliary data signal according to the initial data signal comprises:

receiving, shifting and inverting the initial data signal, to obtain an intermediate data signal;

receiving and converting the intermediate data signal from a parallel data signal to a serial data signal, to output the auxiliary data signal; and receiving and converting the initial data signal from a parallel data signal to a serial data signal, to output the data signal to be processed.

15. The data processing method of claim 13, wherein the drive circuit comprises a first drive circuit and a second drive circuit, and adjusting the value of the drive resistance of the drive circuit according to the target calibration code comprises:

receiving, by the first drive circuit, the target calibration code, and adjusting a value of a drive resistance of the first drive circuit according to the target calibration code, to determine a first drive resistance value; and receiving, by the second drive circuit, the initial calibration code, and adjusting a value of a drive resistance of the second drive circuit according to the initial calibration code, to determine a second drive resistance value.

16. The data processing method of claim 15, wherein adjusting the drive capability of the data signal to be processed according to the auxiliary data signal and the adjusted drive resistance to generate the target data signal comprises:

receiving and driving the auxiliary data signal according to the first drive resistance value, to generate an auxiliary drive signal; and adjusting the drive capability of the data signal to be processed according to the auxiliary drive signal and the second drive resistance value, to generate the target data signal.

17. A semiconductor memory, comprising a data processing circuitry, the data processing circuitry comprising:

a preprocessing circuit, configured to: receive an initial data signal, and generate a data signal to be processed and an auxiliary data signal according to the initial data signal, wherein the initial data signal is a parallel data signal, the data signal to be processed and the auxiliary data signal are both serial data signals, a phase of the auxiliary data signal is opposite to a phase of the data signal to be processed and the auxiliary data signal is delayed from the data signal to be processed by a preset clock period; and a drive circuit, connected with the preprocessing circuit and configured to: adjust an initial calibration code according to a preset scenario, to obtain a target calibration code; adjust a value of a drive resistance of the drive circuit according to the target calibration code; and adjust a drive capability of the data signal to be processed according to the auxiliary data signal and the adjusted drive resistance, to generate a target data signal;

wherein the preprocessing circuit comprises:

an auxiliary processing circuit, configured to: receive the initial data signal, and shift and invert the initial data signal, to obtain an intermediate data signal;

a first processing circuit, connected with the auxiliary processing circuit and configured to: receive the intermediate data signal, and convert the intermediate data signal from a parallel data signal to a serial data signal, to output the auxiliary data signal; and a second processing circuit, configured to: receive the initial data signal, and convert the initial data signal from the parallel data signal to a serial data signal, to output the data signal to be processed;

wherein the preprocessing circuit further comprises:

a clock generator, configured to: receive a first initial clock signal, a second initial clock signal, a third initial clock signal and a fourth initial clock signal, and generate a first target clock signal, a second target clock signal, a third target clock signal and a fourth target clock signal, wherein phases of the first initial clock signal, the second initial clock signal, the third initial clock signal and the fourth initial clock signal are 0 degree, 90 degree, 180 degree and 270 degree respectively;

the first target clock signal is generated from a rising edge of the first initial clock signal, and a pulse width of the first target clock signal is smaller than a pulse width of the first initial clock signal;

the second target clock signal is generated from a rising edge of the second initial clock signal, and a pulse width of the second target clock signal is smaller than a pulse width of the second initial clock signal;

the third target clock signal is generated from a rising edge of the third initial clock signal, and a pulse width of the third target clock signal is smaller than a pulse width of the third initial clock signal; and the fourth target clock signal is generated from a rising edge of the fourth initial clock signal, and a pulse width of the fourth target clock signal is smaller than a pulse width of the fourth initial clock signal;

a first buffer circuit, configured to delay the first initial clock signal and enhance a drive capability of the first initial clock signal, to obtain a first delay clock signal; and a second buffer circuit, configured to delay the third initial clock signal and enhance a drive capability of the third initial clock signal, to obtain a second delay clock signal.

18. The semiconductor memory of claim 17, wherein the semiconductor memory is a dynamic random access memory (DRAM) chip and conforms to a fifth-generation Double Data Rate (DDR5) memory specification.

* * * * *